United States Patent
Han et al.

(10) Patent No.: US 11,379,756 B2
(45) Date of Patent: Jul. 5, 2022

(54) LAUNDRY SCHEDULING APPARATUS AND METHOD

(71) Applicant: LG ELECTRONICS INC., Seoul (KR)

(72) Inventors: Jongwoo Han, Seoul (KR); Jaehong Kim, Seoul (KR); Hyoeun Kim, Seoul (KR); Taeho Lee, Seoul (KR); Hangil Jeong, Seoul (KR); Beomsuk Moon, Seoul (KR); Hyejeong Jeon, Seoul (KR); Yoojin Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 436 days.

(21) Appl. No.: 16/388,712

(22) Filed: Apr. 18, 2019

(65) Prior Publication Data

US 2020/0199800 A1   Jun. 25, 2020

(30) Foreign Application Priority Data

Dec. 19, 2018   (WO) ................ PCT/KR2018/016185

(51) Int. Cl.
*G06N 20/00*   (2019.01)
*D06F 33/00*   (2020.01)
(Continued)

(52) U.S. Cl.
CPC ............. *G06N 20/00* (2019.01); *D06F 33/00* (2013.01); *G06N 3/02* (2013.01); *G06N 7/046* (2013.01);
(Continued)

(58) Field of Classification Search
CPC .......... G06N 20/00; G06N 3/02; G06N 7/046; D06F 33/00; H04L 12/2829; G05B 2219/2623
(Continued)

(56) References Cited

U.S. PATENT DOCUMENTS 10,963,979 B1 *  3/2021  Breitman ............. G06Q 20/127
2011/0270452 A1 * 11/2011  Lu ........................... G06Q 10/06
                                                              700/291
(Continued)

FOREIGN PATENT DOCUMENTS

CN    105803729    7/2016
CN    106884278    6/2017
(Continued)

OTHER PUBLICATIONS

Schmitz et al., "Usage behavior and related energy consumption of European consumers for washing and drying", Energy Efficiency (2014) 7:937-954 (Year: 2014).*

(Continued)

*Primary Examiner* — Tsu-Chang Lee
(74) *Attorney, Agent, or Firm* — Lee Hong Degerman Kang & Waimey

(57) ABSTRACT

Disclosed is a laundry scheduling apparatus. The apparatus includes a communication unit, an output unit, and a processor configured to pair with at least one washing machine via the communication unit, obtain laundry preference parameters of a user generated by learning based on at least one of a deep learning algorithm or a machine learning algorithm, using at least one of a laundry log of the user or laundry satisfaction information of the user as input data, generate laundry scheduling information by using washing machine information about the paired at least one washing machine, the laundry preference parameters, and laundry item information obtained via at least one of a user input unit, an interface unit, or a sensor, and cause the output unit to output the laundry scheduling information.

13 Claims, 15 Drawing Sheets

(51) Int. Cl.
*H04L 12/28* (2006.01)
*G06N 3/02* (2006.01)
*G06N 7/04* (2006.01)

(52) U.S. Cl.
CPC .. *H04L 12/2829* (2013.01); *G05B 2219/2633* (2013.01)

(58) Field of Classification Search
USPC .......................................................... 706/12
See application file for complete search history.

(56) References Cited

U.S. PATENT DOCUMENTS

| | | | |
|---|---|---|---|
| 2013/0086520 | A1 | 4/2013 | Beaudet et al. |
| 2016/0218884 | A1* | 7/2016 | Ebrom ...................... G06F 8/38 |
| 2018/0165486 | A1 | 6/2018 | Bajovic |
| 2018/0305851 | A1 | 10/2018 | Kwon et al. |
| 2019/0199549 | A1 | 6/2019 | Park et al. |
| 2019/0264372 | A1 | 8/2019 | Kessler et al. |

FOREIGN PATENT DOCUMENTS

| | | |
|---|---|---|
| DE | 102016212984 | 1/2018 |
| EP | 3506567 | 7/2019 |
| JP | 2004173729 | 6/2004 |
| JP | 2004195063 | 7/2004 |
| KR | 1019950004258 | 4/1995 |
| KR | 20080082155 | 9/2008 |
| KR | 1020180119486 | 11/2018 |

OTHER PUBLICATIONS

Costanza, et al., "Doing the laundry with Agents: a field trial of a future smart energy system in the home", ACM CHI 2014, Toronto, ON, Canada, 2014 (Year: 2014).*

PCT International Application No. PCT/KR2018/016185, Written Opinion of the International Searching Authority dated Sep. 19, 2019, 9 pages.

European Patent Office Application Serial No. 19214650.4, Search Report dated Mar. 26, 2020, 16 pages.

Evans, G., "Solving Home Automation Problems Using Artificial Intelligence Techniques," IEEE Transactions on Consumer Electronics, Aug. 1991, XP000263213, 6 pages.

The State Intellectual Property Office of the People's Republic of China Application Serial No. 201911317813.2, Office Action dated Dec. 17, 2021, 9 pages.

* cited by examiner

LAUNDRY SCHEDULING APPARATUS AND METHOD

CROSS-REFERENCE TO RELATED APPLICATIONS

Pursuant to 35 U.S.C. § 119 (a), this application claims the benefit of an earlier filing date and right of priority to International Application No. PCT/KR2018/016185 filed on Dec. 19, 2018, the contents of which are hereby incorporated by reference herein in its entirety.

BACKGROUND

Field of the Invention

The present invention relates to a laundry scheduling apparatus and method. In detail, the present invention relates to a laundry scheduling apparatus and method which organically use a plurality of washing machines, based on a laundry log of a user, washing machine information, and a laundry information.

Discussion of the Related Art

Recently, washing machines or washing auxiliary machines are home appliances essential for all homes.

Clothes, bedclothes, or dolls which are to be washed are formed of various materials, and conditions needed for washing differ based on materials. Therefore, recent washing machines or washing auxiliary machines provide several laundry courses, for providing a laundry function suitable for various materials.

When a user selects a predetermined laundry course, washing machines or washing auxiliary machines of the related art provide a corresponding laundry course, or if a user sets a parameter corresponding to each laundry step whenever a washing operation is performed, the washing machines or washing auxiliary machines of the related art provide only a function of providing a laundry course in which a corresponding parameter is reflected.

Moreover, washing machines or washing auxiliary machines may be classified into various types of machines on the basis of a driving manner or a function, and thus, there are many homes which possess a plurality of washing machines or washing auxiliary machines.

For example, examples of washing machines or washing auxiliary machines include top loading washing machines, drum washing machines, clothing care machines (for example, TROMM stylers, air dressers, clothing purifiers, etc.), and laundry drying machines.

However, in the related art, a function of setting a laundry course in consideration of a laundry preference or taste of a user is not provided. Also, in the related art, when a user possesses various washing machines or washing auxiliary machines, an organically integrated laundry schedule in consideration of characteristics of the various washing machines is not provided.

Information disclosed in this Background section was already known to the inventors of the present invention before achieving the present invention or is technical information acquired in the process of achieving the present invention. Therefore, it may contain information that does not form the prior art that is already known in this country to a person of ordinary skill in the art.

SUMMARY

An aspect of the present invention is directed to providing a laundry scheduling apparatus and method which provide an integrated laundry schedule which is suitable for a user and organically uses a plurality of washing machines, based on a laundry log of the user, features of the plurality of paired washing machines, and features of laundry items.

Another aspect of the present invention is directed to providing a laundry scheduling apparatus and method which provides an alternative laundry schedule suitable for removing soil (or pollution) of laundry items, additionally based on a soil level (or pollution rate) of laundry items inputted thereinto.

Another aspect of the present invention is directed to providing a laundry scheduling apparatus and method which provides an alternative laundry schedule suitable for a schedule of a user, additionally based on the schedule of the user.

In an embodiment of the present invention, by using a machine learning algorithm or a deep learning algorithm, a laundry preference may be analyzed from a laundry log of a user, a priority of each washing machine may be determined based on laundry item information and features of a paired plurality of washing machines, and an integrated laundry schedule for distributing laundry items to the washing machines according to the priority of each washing machine may be generated.

In an embodiment of the present invention, soil level information (or pollution rate information) corresponding to laundry items inputted into a washing machine may be obtained when providing a laundry schedule to a user and executing a corresponding laundry schedule, whether a current laundry schedule is suitable for removing soil of a corresponding laundry item may be determined, and when unsuitable, an alternative laundry schedule suitable for removing soil of a corresponding laundry item may be generated.

In an embodiment of the present invention, an alternative laundry schedule may be generated in consideration of a schedule of a user for reducing a laundry time by using a fast laundry course or for delaying a laundry time by using a reservation function so that laundry ends on an arrival time of the user.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
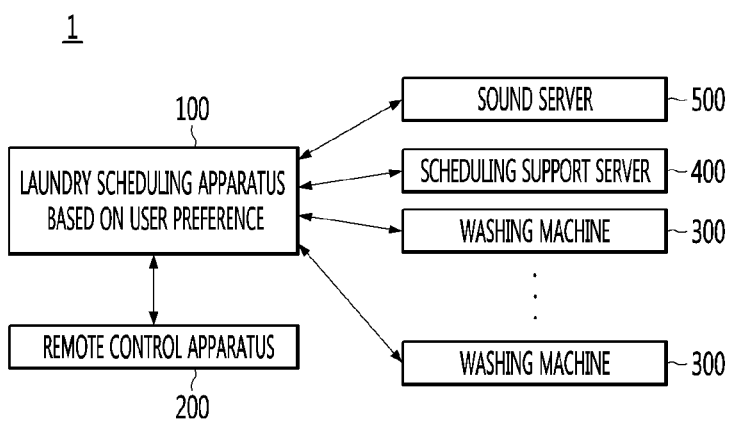
FIG. 1 is a block diagram illustrating a configuration of a laundry scheduling system according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

In this specification, a laundry apparatus and a laundry auxiliary apparatus for performing a function necessary for washing, drying, or dry-cleaning clothes, bedclothes, dolls, and/or the like may each be referred to as a washing machine, a laundry item processing apparatus, or a laundry item processing device. That is, in the present specification, a washing machine may include a laundry apparatus, a laundry drying machine, and a clothing care machine.

A washing machine may be categorized into a drum washing machine and top loading washing machine, based on an operating method thereof and may be categorized into a large washing machine, a general washing machine, and a mini washing machine, based on a size/capacity thereof.

A laundry drying machine may be categorized into a gas type laundry drying machine and an electric type laundry drying machine, based on an operating method thereof and may denote an apparatus for drying laundry items.

A clothing care machine, unlike general washing machines, may denote an apparatus for providing one or more of a function of dry-cleaning clothes, a function of removing dust, and a sterilizing or ironing function using steam, instead of washing clothes with water.

In this specification, items including cloth or fabrics capable of laundry like clothes, bedclothes, and dolls may be referred to as laundry items.

In this specification, a terminal may denote a laundry scheduling apparatus 100 if there is no separate classification.

In this specification, a portable terminal 200 may be referred to as a remote control apparatus 200.

In this specification, a scheduling support server 400 may be referred to as a learning server 400 or a training server 400.

Mobile terminals described in this specification may include mobile phones, smartphones, laptop computers, terminals for digital broadcast, personal digital assistants (PDAs), portable multimedia players (PMPs), navigation systems, slate PCs, tablet PCs, ultrabooks, and wearable devices (for example, smart watches, smart glasses, and head mounted displays (HMDs)).

Moreover, a terminal according to an embodiment of the present invention may be applied to stationary terminals such as desktop computers, digital signage, smart washing machines, smart refrigerators, smart speakers, smart televisions (TVs), smart Internet of things (IoT) integration managing apparatuses, etc.

Moreover, a terminal according to an embodiment of the present invention may be applied to stationary or movable robots.

Moreover, a terminal according to an embodiment of the present invention may perform a function of a voice agent. The voice agent may be a program which recognizes a voice of a user and outputs, as a voice, a response suitable for the recognized voice of the user.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks is configured with an input layer and an output layer.

Moreover, general multilayer neural networks is configured with an input layer, a hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs the received signal to the outside. An input signal between neurons may be multiplied by each connection strength having a value between zero and one, and values obtained through the multiplication may be summated. When the sum is greater than a threshold value of a neuron, the neuron may be activated and may be implemented as an output value through an activation function.

The DNN including a plurality of hidden layers between an input layer and an output layer may be a representative ANN which implements deep learning which is a kind of machine learning technology.

The term "deep learning" may be referred to as "deep learning".

The ANN may be trained by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN trained based on training data may classify or cluster input data, based on a pattern of the input data.

In this specification, an ANN trained based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be trained in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, the ANN may evaluate the analogized function to determine (optimize) a parameter of the ANN.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data based on original data.

Moreover, the discriminator is a model for recognizing a pattern of data and determines whether the authenticity or not of the new data generated by the generator based on the original data.

Moreover, the generator may be trained by receiving and using data which does not deceive the discriminator, and the discriminator may be trained by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, a hidden layer, and an output layer, and input data may pass through the input layer and may enter the hidden layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

FIG. 1 is a block diagram illustrating a configuration of a laundry scheduling system 1 according to an embodiment of the present invention.

Referring to FIG. 1, the laundry scheduling system 1 may include a laundry scheduling apparatus 100, a remote control apparatus 200, one or more washing machines 300, a scheduling support server 400, and a sound server 500.

In an embodiment, the laundry scheduling system 1 may not include at least one of the remote control apparatus 200, the scheduling support server 400, or the sound server 500.

In an embodiment, the laundry scheduling system 1 may be configured with only the laundry scheduling apparatus 100 and the one or more washing machines 300.

The laundry scheduling apparatus 100 may pair with the one or more washing machines 300, learn one or more of laundry satisfaction information and a laundry log of a user as input data to obtain information (laundry preference parameters) about a laundry preference of the user, generate laundry scheduling information by using information about the laundry preference of the user, laundry item information, and washing machine information on paired washing machines, output the generated laundry scheduling information, and control paired washing machines on the basis of the laundry scheduling information.

Here, the laundry scheduling apparatus 100 may be implemented as a TV, a projector, a smartphone, a tablet computer, a set-top box, a DMB receiver, a radio, a washing machine, a refrigerator, a stationary robot, a movable robot, and/or the like. That is, the laundry scheduling apparatus 100 may be implemented in the form of various appliance products used at home.

When the laundry scheduling apparatus 100 is implemented as a washing machine, the laundry scheduling apparatus 100 may pair with the washing machines 300 to configure a plurality of washing machine sets.

When the laundry scheduling apparatus 100 is implemented as a product instead of a washing machine, the laundry scheduling apparatus 100 may pair with the washing machines 300 to configure a plurality of washing machine sets.

The laundry scheduling apparatus 100 may pair with the remote control apparatus 200 and may receive a control signal from the remote control apparatus 200 or may transmit and output data to the remote control apparatus 200.

The laundry scheduling apparatus 100 may transmit a control signal corresponding to laundry scheduling information to the paired washing machines 300. Also, when a control response signal is received from each of the paired washing machines 300, the laundry scheduling apparatus 100 may output a user guide message corresponding to the control response signal or may generate a new control signal to transmit the new control signal to the paired washing machines 300.

The laundry scheduling apparatus 100 may be controlled based on a voice of the user.

The voice of the user may be converted into voice data by the laundry scheduling apparatus 100 or the remote control apparatus 200.

The laundry scheduling apparatus 100 may directly analyze the voice data to obtain meaning information corresponding to the voice data.

The laundry scheduling apparatus 100 may generate a control instruction corresponding to the meaning information to perform control corresponding to the control instruction.

When the laundry scheduling apparatus 100 transmits the voice data to the sound server 500, the sound server 500 may analyze the transmitted voice data to obtain the meaning information corresponding to the voice data and may transmit, to the laundry scheduling apparatus 100, the meaning information or the control instruction corresponding to the meaning information.

The remote control apparatus 200 may denote a remote controller including a microphone, a remote controller of a terminal enabling a menu to operate, and a remote controller application implemented in a smartphone.

For example, the remote control apparatus 200 may receive a voice of the user to generate voice data and may transmit the voice data to the laundry scheduling apparatus 100. Also, the remote control apparatus 200 may receive laundry scheduling information from the laundry scheduling apparatus 100 to output the laundry scheduling information as voice information or image information to the user. Furthermore, the remote control apparatus 200 may generate a power control signal for controlling a power of the laundry scheduling apparatus 100 and may transmit the power control signal to the laundry scheduling apparatus 100.

The remote control apparatus 200 may paired with the laundry scheduling apparatus 100 and may transmit a control signal for controlling the laundry scheduling apparatus 100 or communicate various data with the laundry scheduling apparatus 100.

The remote control apparatus 200 may include a microphone for receiving a voice of a user, and in this case, the remote control apparatus 200 may receive the voice of the user and may transmit the received voice to the laundry scheduling apparatus 100.

The remote control apparatus 200 may include a speaker for outputting a sound, and in this case, the remote control apparatus 200 may output, as a sound, sound data received from the laundry scheduling apparatus 100.

The remote control apparatus 200 may include a display unit for outputting image information, and in this case, the remote control apparatus 200 may display an image corresponding to image data received from the laundry scheduling apparatus 100.

The remote control apparatus 200 may include menus or buttons and may transmit a control signal corresponding to a corresponding menu or button according to an action of the user to the laundry scheduling apparatus 100 to control the laundry scheduling apparatus 100.

The remote control apparatus 200 may include a user input unit or an interface unit and may obtain information corresponding to an action of the user through the user input unit or the interface unit.

The washing machine 300 may denote a laundry item processing apparatus having one or more functions of water laundry, dry-cleaning, ironing, removal of dust, drying, and sterilization each performed on laundry items and may include a laundry apparatus and a laundry auxiliary apparatus.

In an embodiment, the laundry scheduling apparatus 100 may be implemented as a washing machine. In this case, the washing machine 300 may function as the laundry scheduling apparatus 100.

The washing machine 300 may include a communication function or may pair with other washing machines or the laundry scheduling apparatus 100. Furthermore, the washing machine 300 may pair with the remote control apparatus 200.

The washing machine 300 may include various sensors, a camera, or a microphone and may collect sensor information, voice data, or image data. Also, the washing machine 300 may directly process the collected information or data according to a desired purpose, and may also transmit the collected information or data to the laundry scheduling apparatus 100 to receive desired data.

In this case, the sensors of the washing machine 300 may include a proximity sensor, an illumination sensor, an infrared sensor, an ultraviolet sensor, and a visible light sensor.

In this case, the sensor information, the voice data, or the image data each collected from the washing machine 300 may be used to obtain information about the approach or not of an object, information about inputted laundry items, and user identification information. Such an operation may be directly performed by the washing machine 300, and may be also performed by the laundry scheduling apparatus 100, the scheduling support server 400, or the sound server 500.

For example, the washing machine 300, by analyzing voice data, may analyze a meaning of a user's voice, may identify a gender of a current user, and may also specify a current user by identifying a plurality of users.

Moreover, the washing machine 300 may include a memory and may store washing machine information or a washing machine usage log and may transmit the washing machine information or the washing machine usage log to the laundry scheduling apparatus 100.

Here, the washing machine information may include information about a model name, consumption power, an average laundry time, a laundry time of each laundry course, a capacity, a possibility of cloth damage, laundry items suitable/unsuitable for use, and a supported function list.

For example, in a clothing care machine, the supported function list may include information about ironing, removal of dust, and steam sterilization. Also, in a laundry drying machine, the supported function list may include information representing that laundry items unsuitable for use include knits.

Here, the washing machine usage log may denote a laundry log and may include information about a laundry time, a laundry course, and laundry items. Also, information about the laundry course may include laundry power, a temperate of water, a type of detergent, an amount of the detergent, a laundry time of each laundry steps, and the number of repetitions of each laundry steps.

Figure 2:
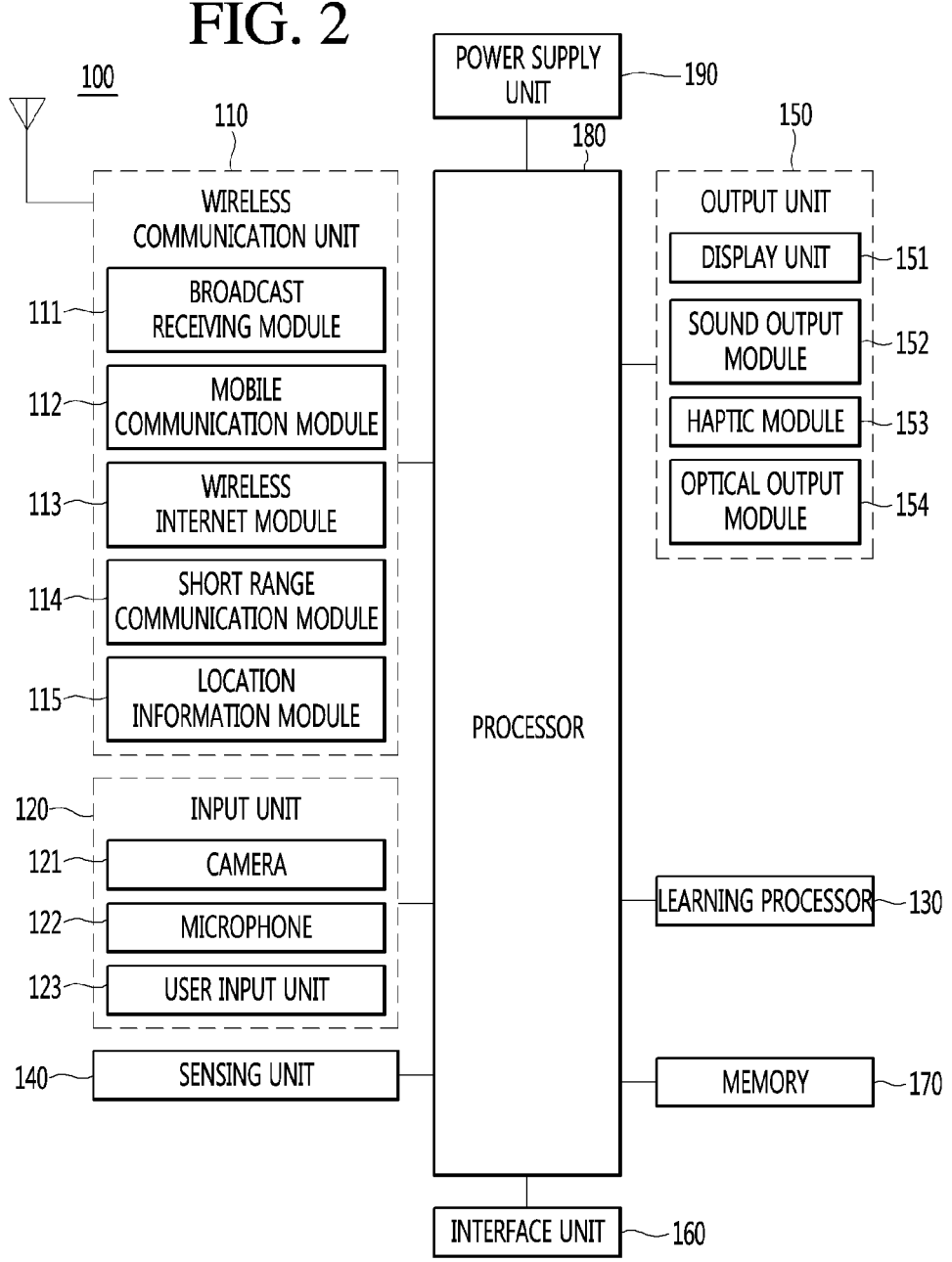
FIG. 2 is a block diagram illustrating a configuration of a laundry scheduling apparatus or a terminal according to an embodiment of the present invention.

The scheduling support server 400 may be a server which is separately provided in the outside and may perform the same function as that of a learning processor 130 illustrated in FIG. 2.

That is, the scheduling support server 400 may be configured to receive, classify, store, and output information which is to be used for data mining, data analysis, intelligent decision, and machine learning algorithms. Here, the machine learning algorithm may include a deep learning algorithm.

The scheduling support server 400 may communicate with at least one laundry scheduling apparatus 100 or the one or more washing machines 300, and by replacing or helping the laundry scheduling apparatus 100 or the washing machine 300, the scheduling support server 400 may analyze or learn data to derive a result. Here, a meaning of helping another apparatus may denote distribution of an operational force through distributed processing.

The scheduling support server 400 may communicate with the sound server 500, and by replacing or helping the sound server 500, the scheduling support server 400 may derive meaning information corresponding to voice data.

The scheduling support server 400 may be provided in plurality to configure a scheduling support server set (or a cloud server), and one or more scheduling support servers 400 included in the scheduling support server set may analyze or learn data through distributed processing to derive a result.

The scheduling support server 400 may collect one or more of a washing machine usage log and laundry satisfaction information of a plurality of users from one or more laundry scheduling apparatuses 100 or the one or more washing machines 300 to configure a database.

Furthermore, the scheduling support server 400 may include a database which stores machine information on washing machines of various manufacturers, laundry item classification information, and laundry item-based laundry information.

The scheduling support server 400 may transmit, to the laundry scheduling apparatus 100, one or more of the washing machine usage log and the laundry satisfaction information of a plurality of users, periodically or according to a request.

The scheduling support server 400 may transmit machine information on various washing machines, laundry item classification information, or laundry item-based laundry information to the laundry scheduling apparatus 100, periodically or according to a request.

The scheduling support server 400 may transmit, to the laundry scheduling apparatus 100, a laundry preference parameter preset generated through machine learning or deep learning, periodically or according to a request.

Here, the laundry preference parameter preset may denote various characteristics of a user derived from laundry satisfaction information or washing machine usage logs of various users and a set of laundry preference parameters corresponding thereto.

For example, users may be classified into ten types by learning data of the users, and ten laundry preference parameter presets may be configured by determining laundry preference parameters of each of the ten types.

The sound server 500 may receive voice data input from the laundry scheduling apparatus 100, the remote control apparatus 200, or the one or more washing machines 300 to obtain meaning information and may return the obtained meaning information.

The sound server 500 may obtain meaning information corresponding to voice data through the scheduling support server 400 or along with the scheduling support server 400.

The sound server 500 and the scheduling support server 400 may be configured as one integrated server. According to various embodiments, a server may be provided in plurality or as one, or a server may be divided based on functions or may be integrated into one server. The present invention is not limited thereto.

FIG. 2 is a block diagram illustrating a configuration of a terminal or a laundry scheduling apparatus 100 according to an embodiment of the present invention.

Referring to FIG. 2, the terminal or the laundry scheduling apparatus 100 may include a wireless communication unit 110, an input unit 120, a learning processor 130, a sensing unit 140, an output unit 150, an interface unit 160, a memory 170, a processor 180, and a power supply unit 190.

Figure 3:
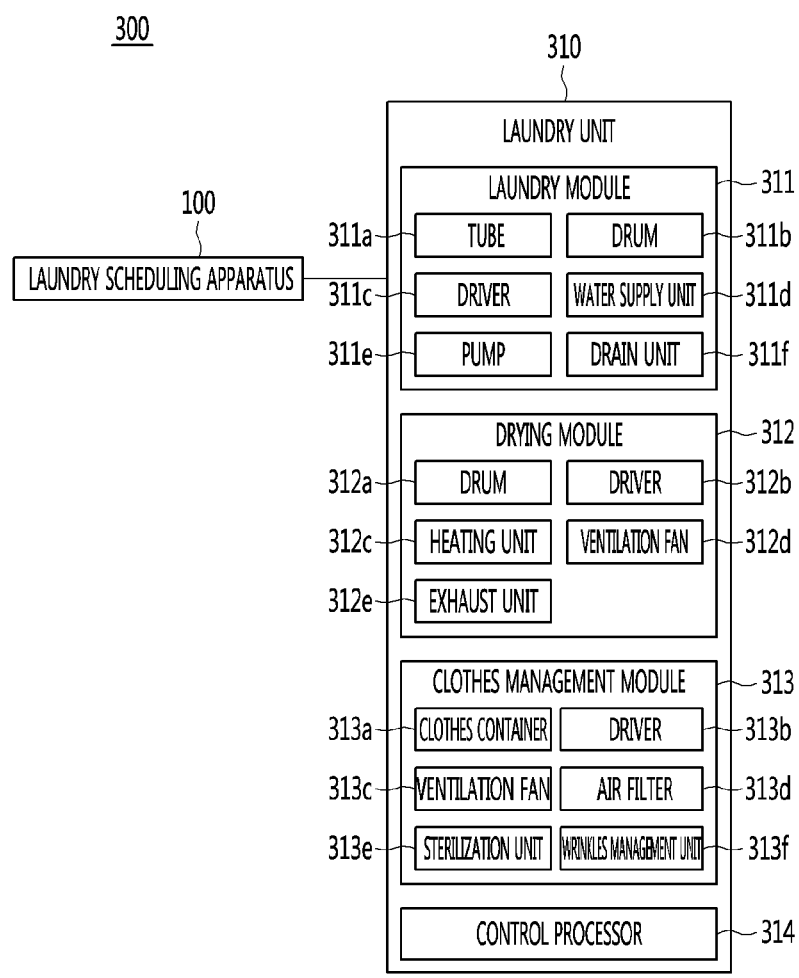
FIG. 3 is a block diagram illustrating a configuration of a laundry item processing apparatus according to an embodiment of the present invention.

In an embodiment, when the laundry scheduling apparatus 100 denotes a washing machine or is implemented in a washing machine, the laundry scheduling apparatus 100 may further include a laundry unit 310 illustrated in FIG. 3.

The laundry unit 310 may include elements for providing a laundry function. For example, the laundry function may include supplying of water, draining of water, laundry, rinsing, drying, dry-cleaning, removal of dust, ironing, etc.

The wireless communication unit 110 may include at least one of a broadcast receiving module 111, a mobile communication module 112, a wireless Internet module 113, a short-range communication module 114, or a location information module 115.

In this case, the wireless communication unit 110 may transmit or receive a signal to or from the one or more washing machines 300.

In this case, the wireless communication unit 110 may transmit or receive a signal to or from the remote control apparatus 200.

In this case, the wireless communication unit 110 may transmit or receive a signal to or from one or more of the sound server 500 and the scheduling support server 400.

A transmitted or received signal may include a pairing signal for apparatus pairing, a control signal for controlling a paired apparatus, and signals corresponding to other data.

The broadcast receiving module 111 of the wireless communication unit 110 may receive a broadcast signal and/or broadcast related information from an external broadcast management server through a broadcast channel.

The mobile communication module 112 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless Internet module 113 refers to a module for wireless internet access and may be built in or external to the mobile terminal 100. The wireless Internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The location information module 115 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The learning processor 130 may be configured to receive, classify, store, and output information which is to be used for data mining, data analysis, intelligent decision, and machine learning algorithms.

The learning processor 130 may include one or more memory units which are configured to store data received, detected, sensed, or generated by a terminal or data output by another component, another device, another terminal, or an apparatus communicating with the terminal.

The learning processor 130 may include a memory which is integrated into or implemented in a terminal. In some embodiments, the learning processor 130 may be implemented with the memory 170.

Optionally or additionally, the learning processor 130 may be implemented with a memory associated with a terminal like an external memory directly coupled to the terminal or a memory which is maintained in a server communicating with the terminal.

In another embodiment, the learning processor 130 may be implemented with a memory maintained in a cloud computing environment or another remote memory position accessible by a terminal through a communication manner such as a network.

The learning processor 130 may be configured to store data in one or more databases, for supervised or unsupervised learning, data mining, prediction analysis, or identifying, indexing, categorizing, manipulating, storing, searching for, and outputting data to be used in another machine.

Information stored in the learning processor 130 may be used by the processor 180 or one or more other controllers of a terminal by using at least one of various different types of data analysis algorithm or machine learning algorithm.

Examples of such algorithms may include a k-nearest neighbor system, a purge logic (for example, possibility theory), a neural network, Boltzmann machine, vector quantization, a pulse neural network, a support vector machine, a maximum margin classifier, hill climbing, an induction logic system Bayesian network, perrytnet (for example, a finite state machine, a milli machine, and a moor finite state machine), a classifier tree (for example, a perceptron tree, a support vector tree, a Markov tree, a decision tree forest, and an arbitrary forest), a reading model and system, artificial mergence, sensor mergence, image mergence, reinforcement mergence, augment reality, pattern recognition, and automated plan.

The processor 180 may determine or predict at least one executable operation of a terminal, based on information determined or generated by using a data analysis algorithm and a machine learning algorithm. To this end, the processor 180 may request, search for, receive, or use data of the learning processor 130 and may control the terminal to execute a predicted operation or a preferably determined operation of the at least one executable operation.

The processor 180 may perform various functions of implementing an intelligent emulation (i.e., a knowledge-based system, an inference system, and a knowledge acquisition system). The processor 180 may be applied to various types of systems (for example, a purge logic system) including an adaptive system, a machine learning system, and an ANN.

The processor 180 may include a sub-module enabling an arithmetic operation of processing a voice and a natural language voice, like an input/output (I/O) processing module, an environment condition processing module, a speech-to-text (STT) processing module, a natural language processing module, a work flow processing module, and a service processing module.

Each of such sub-modules may access one or more systems or data and models or a subset or superset thereof in a terminal. Also, each of the sub-modules may provide various functions in addition to vocabulary index, user data, a work flow model, a service model, and an automatic speech recognition (ASR) system.

In another embodiment, another aspect of the processor 180 or a terminal may be implemented with the sub-module, system, or data and model.

In some embodiments, based on data of the learning processor 130, the processor 180 may be configured to detect and sense a requirement on the basis of an intention of a user or a context condition expressed as a user input or a natural language input.

The processor 180 may actively derive and obtain information which is needed in completely determining the requirement on the basis of the intention of the user or the context condition. For example, the processor 180 may analyze past data including an input log, an output log, pattern matching, unambiguous words, and an input intention, thereby actively deriving needed for determining the requirement.

The processor 180 may determine task flow for executing a function of responding to the requirement, based on the intention of the user or the context condition.

The processor 180 may be configured to collect, sense, extract, detect, and/or receive a signal or data used for data analysis and a machine learning operation through one or more sensing components in a terminal, for collecting information which is to be processed and stored in the learning processor 130.

Collecting of information may include an operation of sensing information through a sensor, an operation of extracting information stored in the memory 170, or an operation of receiving information through a communication means from another terminal, an entity, or an external storage device.

The processor 180 may collect usage history information from the terminal and may store the collected usage history information.

The processor 180 may determine an optimal match for executing a specific function by using the stored usage history information and prediction modeling.

The processor 180 may receive or sense ambient environmental information or other information through the sensing unit 140.

The processor 180 may receive a broadcast signal and/or broadcast-related information, a wireless signal, and wireless data through the wireless communication unit 110.

The processor 180 may receive image information (or a corresponding signal), audio information (or a corresponding signal), data, or user input information through the input unit 120.

The processor 180 may collect information in real time and may process or classify the collected information (for example, a knowledge graph, an instruction policy, an individualization database, a dialogue engine, etc.) and may store the processed information in the memory 170 or the learning processor 130.

When an operation of the terminal is determined based on the data analysis algorithm, the machine learning algorithm, and technique, the processor 180 may control elements of the terminal for executing the determined operation. Also, the processor 180 may control the terminal according to a control instruction to perform the determined operation.

When a specific operation is performed, the processor 180 may analyze history information representing execution of the specific operation through the data analysis algorithm, the machine learning algorithm, and technique and may update previously learned information, based on the analyzed information.

Therefore, the processor 180 may enhance an accuracy of a future performance of each of the data analysis algorithm, the machine learning algorithm, and the technique along with the learning processor 130, based on the updated information.

The sensing unit 140 may include at least one sensor for sensing at least one of information in a mobile terminal, environmental information around a mobile terminal, or user information.

For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), or a chemical sensor (for example, an electronic nose, a healthcare sensor, and a biometric sensor). Moreover, a mobile terminal disclosed in this specification may combines information sensed by at least two or more sensors among such sensors and may then utilize it.

The output unit 150 is used to generate a visual, auditory, or haptic output and may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module, an audio Input/Output (I/O) port, an image I/O port, or an earphone port. In correspondence to that an external device is connected to the interface unit 160, the mobile terminal 100 may perform an appropriate control relating to the connected external device.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface unit 160.

The memory 170 may store data for supporting various functions of the terminal 100.

The memory 170 may store a plurality of application programs or applications executed in the terminal 100, pieces of data and instructions for an operation of the terminal 100, and pieces of data (for example, at least one piece of algorithm information for machine learning) for an operation of the learning processor 130.

The processor 180 may control overall operations of the mobile terminal 100 generally besides an operation relating to the application program. The processor 180 may provide appropriate information or functions to a user or process them by processing signals, data, and information inputted/outputted through the above components or executing application programs stored in the memory 170.

Additionally, in order to execute an application program stored in the memory 170, the processor 180 may control at least part of the components shown in FIG. 2. Furthermore, in order to execute the application program, the processor 180 may combine at least two of the components in the mobile terminal 100 and may then operate it.

The power supply unit 190 may receive external power or internal power under a control of the processor 180 and may then supply power to each component in the mobile terminal 100. The power supply unit 190 includes a battery and the battery may be a built-in battery or a replaceable battery.

As described above, the processor 180 may control an operation associated with an application program and an overall operation of the terminal 100. For example, when a state of the terminal 100 satisfies a predetermined condition, the processor 180 may execute or release a lock state which limits an input of a control command of a user for applications.

FIG. 3 is a block diagram illustrating a configuration of a laundry item processing apparatus 300 according to an embodiment of the present invention.

Referring to FIG. 3, the laundry item processing apparatus 300 may include the terminal 100 illustrated in FIG. 2 and the laundry unit 310 illustrated in FIG. 3.

The terminal 100 may be an internal element of the laundry item processing apparatus 300 and may be configured through modularization.

The laundry item processing apparatus 300 may include, as parallel elements, internal elements of the terminal 100 illustrated in FIG. 2 and the laundry unit 310 illustrated in FIG. 3.

The laundry unit 310 may include one or more of a laundry module 311 for performing a laundry-related function, a drying module 312 for performing a drying-related function, a clothes management module 313 for performing a function associated with management of other clothes, and a control processor 314 for controlling the modules 311, 312, and 313.

The laundry module 311 may perform laundry-related functions such as soaking, laundry, rinsing, and dehydration.

The drying module 312 may perform a function of drying laundry items by using various methods, and for example, may dry the laundry items by using wind (hot air or cold air).

The clothes management module 313 may perform various clothes management-related functions such as hanging of clothes, dry-cleaning, removal of dust, sterilization, pressing out wrinkles, and ironing.

The processor 180 or the control processor 314 included in the laundry unit 310 may control elements included in the laundry module 311, the drying module 312, or the clothes management module 313 of the laundry unit 310 to provide various laundry functions.

For example, in a case where the processor 180 controls the modules 311, 312, and 313 of the laundry unit 310, the laundry unit 310 may not include the control processor 314.

The input unit 120 and the sensing unit 140 may collect data corresponding to an interaction of the user associated with the use and control of the laundry unit 310. For example, the input unit 120 and the sensing unit 140 may collect course selection information and control information, based on a voice or an interaction.

The output unit 150 may output information associated with the use and control of the laundry unit 310. For example, the output unit 150 may output course information, a usage log, and control information each corresponding to laundry, drying, and clothes care.

The memory 170 may store the information associated with the use and control of the laundry unit 310. For example, the memory 170 may store the course information, the usage log, and the control information each corresponding to laundry, drying, and clothes care.

In detail, the laundry module 311 may include a tube 311a where washing water is stored, a drum 311b which is rotatably installed in the tube and into which laundry items are inputted and contained, a driver 311c which rotates the drum, a water supply unit 311d which supplies the washing water, a pump 311e which circulates or discharges the washing water, and a drain unit 311f which drains the discharged washing water.

The drum 311b into which the laundry items are accommodated may be rotatably provided in the tube 311a. The drum 311b may accommodate laundry items and may include an inlet into which the laundry items are inputted and which is disposed on a front surface or an upper surface, and the drum 311b may rotate about a rotation center line which is approximately horizontal or vertical. A plurality of holes may be provided in the drum 311b so that the washing water in the tube 311b flows into the drum 311b.

Here, "horizontal" or "vertical" may not be the term used as a meaning which is mathematically strict. That is, in an embodiment, even when the rotation center line is inclined at a certain angle with respect to horizontality or verticality, the rotation center line is close to horizontality, and thus, the rotation center line may be described as substantially horizontal or vertical.

The water supply unit 311d may include a water supply valve, a water supply duct, and a water supply hose.

When supplying water, the washing water passing through the water supply value and the water supply duct may be mixed with a detergent in a detergent dispenser, and then, may be supplied to the tube 311a through the water supply hose.

A direct water supply duct may be connected to the water supply valve, and the washing water may be directly suppled to the tube 311a without being mixed with the detergent.

The pump 311e may function as the drain pump 311e which discharges the washing water and a circulation pump 311e which circulates the washing water, but each of the drain pump 311e and the circulation pump 311e may be separately installed.

The pump 311e may be connected to a drain duct included in the drain unit 311f and may discharge the washing water to the outside through the drain duct. Also, the pump 311e may be connected to a circulation water supply duct and may jet the washing water, stored in the tube 311a, to the inside of the drum 311b through the circulation water supply duct to circulate the washing water.

One or more protrusions which protrude toward the inside of the drum 311b may be provided on an inner surface of the drum 311b.

The protrusion may be a lifter disposed on the inner surface of the drum 311b, or may be an embossing provided as one body. In a case where the lifter or the embossing is provided on the inner surface of the drum 311*b*, the laundry items may be raised or lowered by the lifter when the drum 311*b* rotating.

The driver 311*c* may rotate the drum 311*b*, and a driving shaft rotated by the driver 311*c* may pass through a rear portion of the tube 311*a* and may be coupled to the drum 311*b*.

The driver 311*c* may include a motor of which a speed is controllable.

In this case, the motor may be an inverter direct drive motor.

The control processor 314 may receive an output value (for example, an output current) of the motor of the driver 311*c* and may perform control the number of rotations (or a rotational speed) of the motor of the driver 311*c* to follow a predetermined target rotation number (or a target rotational speed), based on the received output value. Also, the control processor 314 may control driving of the motor of the driver 311*c*, based on a driving pattern.

Moreover, the drying module 312 may include a drum 312*a* into which the laundry items are inputted, a driver 312*b* which rotates the drum 312*a*, a heating unit 312*c* which heats air, a ventilation fan 312*d* which circulates internal air, and an exhaust unit 312*e* which discharges the internal air.

The drum 312*a* may be a space where dried items are dried and may be rotatably installed in a body part thereof. Also, one or more lifters for raising or lowering the dried items may be provided in the drum 312*a*.

The drum 312*a* may be connected to an intake port (not shown), and air may flow into the drum 312*a* by the ventilation fan 312*d*.

The driver 312*b* may rotate the drum 312*a*, and a driving shaft rotated by the driver 312*b* may be coupled to the drum 312*a*.

The driver 312*b* may include a motor of which a speed is controllable.

In this case, the motor may be an inverter direct drive motor.

The control processor 314 may receive an output value (for example, an output current) of the motor of the driver 312*b* and may perform control the number of rotations (or a rotational speed) of the motor of the driver 312*b* to follow a predetermined target rotation number (or a target rotational speed), based on the received output value. Also, the control processor 314 may control driving of the motor of the driver 312*b*, based on a driving pattern.

The heating unit 312*c* may include a heating part which heats internal air of the drum 312*a* or air flowing in from the outside.

The heating part may heat air by using various energy sources such as a gas type or an electricity type, and in the electricity type, the heating part may use a coil heater.

The heating unit 312*c* may include a plurality of heating parts, and each of the heating parts may use various energy sources which differ and may have different performances.

The ventilation fan 312*d* may circulate air heated by the heating unit 312*c* or the internal air of the drum 312*a*.

The exhaust unit 312*e* may perform guiding the internal air of the drum 312*a* so that the internal air is discharged to the outside and may include an exhaust duct and an air filter.

Moreover, the clothes management module 313 may include a clothes container 313*a* which is a space where clothes are placed, a driver 313*b* which moves a hanger included in the clothes container 313*a*, a ventilation fan 313*c* which circulates internal air, an air filter 313*d*, a sterilization unit 313*e*, and a wrinkles management unit 313*f*.

The clothes container 313*a* may be a space which accommodates clothes (or laundry items) which are to be managed or processed and may include a hanger for fixing clothes. For example, the clothes container may include a clothes rack and a hook for supporting the clothes rack, or may include a three-dimensional shape such as a torso and a mannequin.

The clothes container 313*a* may be connected to an intake port (not shown), and air may flow into the clothes container 313*a* by the ventilation fan 313*c*.

The driver 313*b* may drive the hanger to induce a predetermined motion to clothes hanged on the hanger.

For example, the driver 313*b* may operate to vibrate the hanger and clothes hanged on the hanger, based on a certain vibration pattern. As the hanged clothes vibrate, dust or foreign materials attached on or adhered to the clothes may be removed.

The driver 313*b* may include a motor of which a speed is controllable.

In this case, the motor may be an inverter direct drive motor.

The control processor 314 may receive an output value (for example, an output current) of the motor of the driver 313*b* and may perform control the number of rotations (or a rotational speed) of the motor of the driver 313*b* to follow a predetermined target rotation number (or a target rotational speed), based on the received output value. Also, the control processor 314 may control driving of the motor of the driver 313*b*, based on a driving pattern.

The ventilation fan 313*c* may supply, to the inside of the clothes container 313*a*, air flowing in from the outside of the clothes container 313*a* or internal air of the clothes container 313*a* to circulate air.

The ventilation fan 313*c* may be installed so that air supplied to the clothes container 313*a* to collide with the hanged clothes, and an air supply direction may be controlled.

For example, the ventilation fan 313*c* may jet air to the hanged clothes, and thus, may induce air attached on or adhered to the clothes to be detached from the clothes or may remove wet of the clothes.

The air filter 313*d* may filter out dust when internal air of the clothes container 313*a* circulates or is discharged to the outside.

The sterilization unit 313*e* may include various sterilization apparatuses which sterilize the hanged clothes.

For example, the sterilization apparatus may include a sterilization apparatus which uses ozone and a sterilization apparatus which uses ultraviolet.

The wrinkles management unit 313*f* may reduce or remove wrinkles of the hanged clothes and may include a steam supplier, an iron, and an iron board.

The steam supplier may heat water supplied thereto to generate steam and may naturally supply the steam to the clothes container 313*a* or may directly jet the steam to the hanged clothes.

The iron and the iron board may be provided in the clothes container 313*a*. Also, an operation thereof may be controlled according to ironing operation information determined based on the shapes, positions, and materials of clothes which are to be ironed.

In this case, the ironing operation information may include a position/moving line of each of the iron and the iron board and a temperature/time of each of the iron and the iron board.

The control processor 314 may control a driver separately provided in the driver 313*b* or the wrinkles management unit 313f to control movement of the iron and the iron board and may control the iron and the iron board, based on the ironing operation information.

Figure 4:
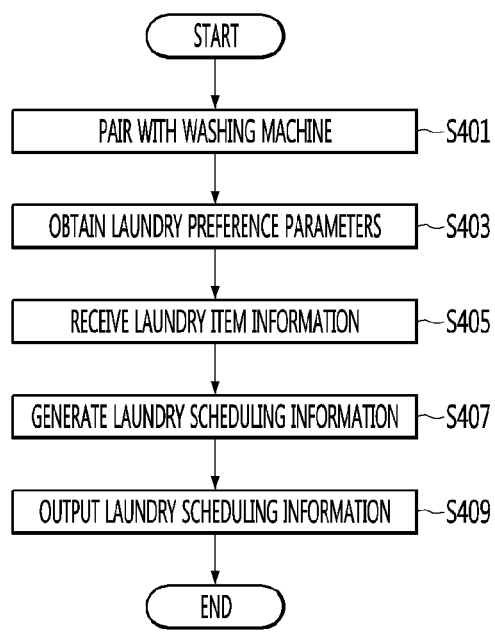
FIG. 4 is an operation flowchart illustrating a laundry scheduling method according to an embodiment of the present invention.

FIG. 4 is an operation flowchart illustrating a laundry scheduling method according to an embodiment of the present invention.

Referring to FIG. 4, in the laundry scheduling method according to an embodiment of the present invention, the wireless communication unit 110 of the laundry scheduling apparatus 100 may transmit or receive a pairing signal to or from the one or more washing machines 300 to pair with the one or more washing machines 300 (S401).

At this time, the laundry scheduling apparatus 100 may obtain washing machine information on the paired washing machine 300.

The washing machine information may include information on a washing machine model name, washing machine consumption power, a washing machine average laundry time, a laundry time of each laundry courses of the washing machine, a supported course, a supported function, suitable laundry items, and unsuitable laundry items.

The processor 180 of the laundry scheduling apparatus 100 may obtain laundry preference parameters for each user generated by learning, as input data, one or more of a laundry log of the user and laundry satisfaction information of the user (S403).

For example, when a plurality of users exist, the processor 180 may specify a current user through analyzing a voice of the user or an interaction of the user.

A laundry log, laundry satisfaction information, and laundry preference parameters may be classified for each user.

The laundry satisfaction information may denote a level of satisfaction of laundry which corresponds to specific laundry log and is obtained based on an interaction of a user.

For example, the laundry satisfaction information may be obtained based on user question and answer (Q&A).

Moreover, the laundry satisfaction information may be obtained through a heuristics technique despite there being no specific user input.

For example, although there is no laundry satisfaction information, when a specific user repeatedly uses the same laundry course, it may be determined that the specific user is high in preference and is high in level of satisfaction to the corresponding laundry course.

In this case, as in the following Equation (1), by using laundry preference parameters as weights, a level of satisfaction of laundry corresponding to each item of washing machine information may be calculated.

Level of satisfaction of laundry=(laundry preference parameter 1)*(operating cost of each washing machine)+(laundry preference parameter 2)*(operating time of each washing machine)+(laundry preference parameter 3)*(capacity of each washing machine)+(laundry preference parameter 4)*(recommended amount of laundry items) [Equation 1]

The capacity of each washing machine may denote a maximum capacity of each washing machine, a maximum/minimum capacity for preventing damage of cloth, and a maximum/minimum capacity for high speed laundry.

The recommended amount of laundry items may denote the amount of laundry items which ensures a cleaning force equal or greater than a reference value.

Here, the laundry preference parameters may include an operating cost parameter, a laundry time parameter, a capacity parameter, a damage level parameter, and a cleaning force parameter.

In this case, each of the preference parameters may denote a weight corresponding to each item of the washing machine information.

For example, to a user who has a highest value on a laundry time of a washing machine, the laundry time parameter for the user may be set to be higher than the other laundry preference parameters, and thus, a high weight may be assigned to a laundry time.

In this case, each of the laundry preference parameters may not correspond to each item (for example, the operating cost, a laundry time, a capacity, a damage level, a cleaning force, etc.) of the washing machine information in a one-to-one (1:1) relationship, but may have a multi-to-multi relationship.

For example, a preference weight corresponding to an operation cost may be calculated from the laundry preference parameter 1 and the laundry preference parameter 2 by using a first weight ratio (for example, 3:6), and a preference weight corresponding to a laundry time may be calculated from the laundry preference parameter 1 and the laundry preference parameter 2 by using a second weight rate (for example, 2:1).

That is, each laundry preference parameter may not intuitively provide a meaning or a relationship with components associated with a laundry preference.

In this case, the laundry preference parameters may be learned (trained) by using at least one of the machine learning algorithm or the deep learning algorithm.

In this case, the laundry preference parameters may be learned (trained) in the learning processor 130 of the laundry scheduling apparatus 100 or the scheduling support server 400. Also, the laundry preference parameters may be learned (trained) in the learning processor 130 and the scheduling support server 400 through distributed processing.

At this time, the processor 180 may additionally reflect laundry logs of the other users or laundry satisfaction information of the other users to update the laundry preference parameters.

In this case, the processor 180 may learn (train), directly or through the scheduling support server 400, the laundry logs of the other users and the laundry satisfaction information of the other users to update the laundry preference parameters.

In this case, the scheduling support server 400 may include a database which stores laundry logs of several users or laundry satisfaction information of the several users.

The processor 180 of the laundry scheduling apparatus 100 may receive laundry item information on laundry items which are to be washed (S405).

In this case, the laundry item information may be obtained through voice data specifying a laundry item based on utterance of a user. For example, the processor 180 may receive voice data "white, blouse, and coffee smear" to obtain laundry item information.

In this case, the laundry item information may be obtained through an interaction of a user with the interface unit 160. For example, when a user takes an interaction with a "white" button, a "blouse" button, and a "coffee" button each displayed on the interface unit 160, laundry item information corresponding to each of the buttons may be obtained.

In this case, the laundry item information may be obtained through sensors included in the sensing unit 140. For example, the laundry item information may be obtained by sensing a clothes tag, barcode, and a recognition chip attached on laundry items.

The processor 180 of the laundry scheduling apparatus 100 may generate laundry scheduling information by using washing machine information, laundry item information, and laundry preference parameters (S407).

For example, the washing machine information may include information about a type, a model name, consumption power, an average laundry time, a capacity, a possibility of cloth damage, and a feature as listed in the following Table 1.

TABLE 1

| | Type | | | |
|---|---|---|---|---|
| | Top loading washing machine | Drum washing machine | Mini washing machine | Clothing care machine |
| Model name | TS20BV | FH21VBW | F5VR | S5MB |
| Consumption power | 1500 W | 2200 W | cold water 145 W/heating 1530 W | 1700 W |
| Average laundry time | 39 minutes | 70 minutes | 42 minutes | 51 minutes |
| Capacity | 20 kg | 21 kg | 5 kg | five tops + a pair of trousers |
| Possibility of cloth damage | high | middle | middle | low |
| Feature | — | — | — | suitable for clothes difficult to wash (knit, suit, coat) |

Considering the laundry machine information and the laundry preference parameters, washing machine feature-based priority or preference-based priority may be determined as listed in the following Table 2.

TABLE 2

| | No. 1 priority | No. 2 priority | No. 3 priority | No. 4 priority |
|---|---|---|---|---|
| Consumption power | Top loading washing machine | Drum washing machine | Mini washing machine | Clothing care machine |
| Average laundry time | top loading washing machine | mini washing machine | styler | drum washing machine |
| Possibility of cloth damage | clothing care machine | drum washing machine | mini washing machine | top loading washing machine |
| Capacity | drum washing machine | top loading washing machine | mini washing machine | clothing care machine |
| Special function | clothing care machine | — | — | — |
| User preference | top loading washing machine | drum washing machine | mini washing machine | clothing care machine |

In this case, the processor 180 may determine priorities of paired washing machines by using the laundry preference parameters and the washing machine information and may generate laundry scheduling information including an operating sequence of the paired washing machines based on the priority.

For example, when a user prioritize a consumption power by considering the laundry preference parameters are considered, the processor 180 may determine priorities corresponding to the ascending order of consumption power as "top loading washing machine", "drum washing machine", "mini washing machine", and "clothing care machine".

In a case when a user prioritizes consumption power and takes much care of a level of cloth damage by considering the laundry preference parameters, the processor 180 may determine a washing machine priority based on a level of cloth damage.

In this case, the processor 180 may generate laundry scheduling information including laundry item distribution information about paired washing machines, based on laundry item information and priorities of the paired washing machines.

In this case, the processor 180 may generate laundry scheduling information including a laundry course of each of paired washing machines by using one or more of laundry item information and laundry preference parameters of a user.

In this case, for two or more washing machines (for example, a drum washing machine and a laundry drying machine) of which laundry processes are associated with each other, the processor 180 may generate laundry scheduling information including input time information about a pre-processing washing machine (for example, a drum washing machine) by considering an available time of a post-processing washing machine (for example, a laundry drying machine).

For example, in laundry scheduling information which allows a drum washing machine to wash a laundry item A, it may be assumed that 60 minutes are taken in washing the laundry item A with the drum washing machine and a laundry drying machine is available after 70 minutes. In this case, the processor 180 may delay, by ten minutes, a time when the laundry item A is inputted (or introduced) into the drum washing machine, and thus, may generate laundry scheduling information where an end time of the laundry matches an input time of the washed item into a laundry drying machine.

The processor 180 of the laundry scheduling apparatus 100 may output the generated laundry scheduling information to provide the generated laundry scheduling information to a user (S409).

At this time, the processor 180 may output the laundry scheduling information through the output unit 150.

Figure 14:
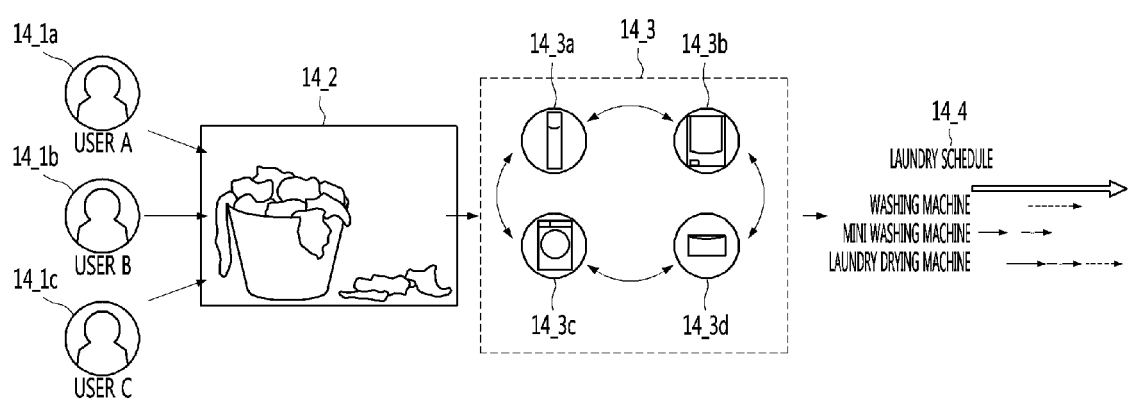
FIG. 14 is a diagram illustrating a laundry scheduling method according to an embodiment of the present invention.

The display unit 151 may display a laundry scheduler 15_4 of FIG. 14 as image information corresponding to the laundry scheduling information.

Moreover, the display unit 151 may display a message "input the laundry item A into a washing machine a now, and after 30 minutes, input a laundry item B into a washing machine b".

Moreover, the display unit 151 may display, as picture information, information about input of laundry items corresponding to a laundry schedule by using a pictogram.

The sound output unit 152 may output, as a voice, the message "input the laundry item A into a washing machine a now, and after 30 minutes, input a laundry item B into a washing machine b".

At this time, the processor 180 may transmit the laundry scheduling information to the remote control apparatus 200 through the wireless communication unit 110, and the remote control apparatus 200 may output the laundry scheduling information as image information or voice information.

In this case, the processor 180 may transmit the laundry scheduling information to the washing machine 300 through the wireless communication unit 110, and the washing machine 300 may output the laundry scheduling information as image information or voice information.

In this case, the processor 180 may transmit the laundry scheduling information to the remote control apparatus 200 through the wireless communication unit 110, and the remote control apparatus 200 may output the laundry scheduling information as image information or voice information.

The processor 180 of the laundry scheduling apparatus 100 may receive control information or laundry item input information from the paired washing machines 300 and may determine whether an operation is correctly performed as the laundry scheduling information.

When laundry is not performed corresponding to the laundry scheduling information, the processor 180 of the laundry scheduling apparatus 100 may control the output unit 150 to output the laundry scheduling information again.

For example, when a laundry operation differing from the laundry scheduling information is performed, the processor 180 may again generate alternative laundry scheduling information based on current laundry item information.

The processor 180 of the laundry scheduling apparatus 100 may obtain laundry satisfaction information corresponding to the laundry scheduling information from a user through the interface unit 160 or the input unit 120. Also, the obtained laundry satisfaction information may be stored in the memory 170.

The wireless communication unit 110 of the laundry scheduling apparatus 100 may transmit at least one of the laundry scheduling information, a laundry log, or the laundry satisfaction information to the scheduling support server 400.

In an embodiment, step S405 of receiving the laundry item information and step S403 of obtaining the laundry preference parameters may be performed in parallel.

In an embodiment, step S405 of receiving the laundry item information may be first performed, and then, step S403 of obtaining the laundry preference parameters may be performed.

Figure 5:
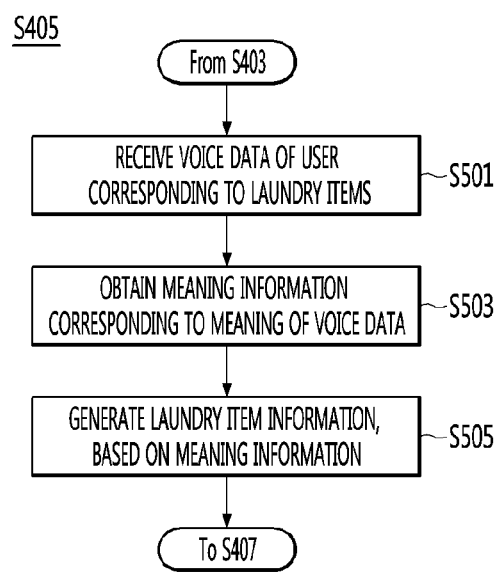
FIG. 5 is an operation flowchart illustrating an example of a step of receiving laundry item information illustrated in FIG. 4.

FIG. 5 is an operation flowchart illustrating an example of step S405 of receiving the laundry item information illustrated in FIG. 4.

Referring to FIG. 5, the microphone 122 of the laundry scheduling apparatus 100 may generate voice data from an utterance voice of a user for laundry items, and the processor 180 may receive the voice data (S501).

For example, the utterance voice of the user may include laundry item specific information for classifying laundry items like "a first dress is a black cotton T-shirt, and a second dress is a wool knit and is stained with coffee". Furthermore, soil level information about each of the laundry items may be included in the utterance voice of the user.

The processor 180 of the laundry scheduling apparatus 100 may convert voice data of the laundry items into text data directly or through the sound server 500 and may obtain meaning information corresponding to the converted text data (S503).

In this case, a speech to text (STT) engine of the processor 180 or an STT engine of the sound server 500 may convert the voice data into the text data.

In this case, the processor 180 or the sound server 500 may obtain the meaning information corresponding to a meaning of the text data by using the machine learning algorithm or the deep learning algorithm.

The meaning information may include keywords related to corresponding text data.

For example, meaning information corresponding to text data "a first dress is a black cotton T-shirt" may include "dress 1", "black", "cotton", and "T-shirt".

For example, in a case where the sound server 500 and the scheduling support server 400 are configured as one body, the scheduling support server 400 may convert voice data into text data and may obtain meaning information corresponding to the converted text data.

The processor 180 of the laundry scheduling apparatus 100 may generate laundry item information, based on the meaning information (S505).

The laundry item information may include a color, a material, a type, a size, a weight, a volume, and a soil level of each laundry item.

The user may describe by a feature of each laundry item by uttering, and the processor 180 may generate laundry item information by using meaning information corresponding to voice data.

Figure 6:
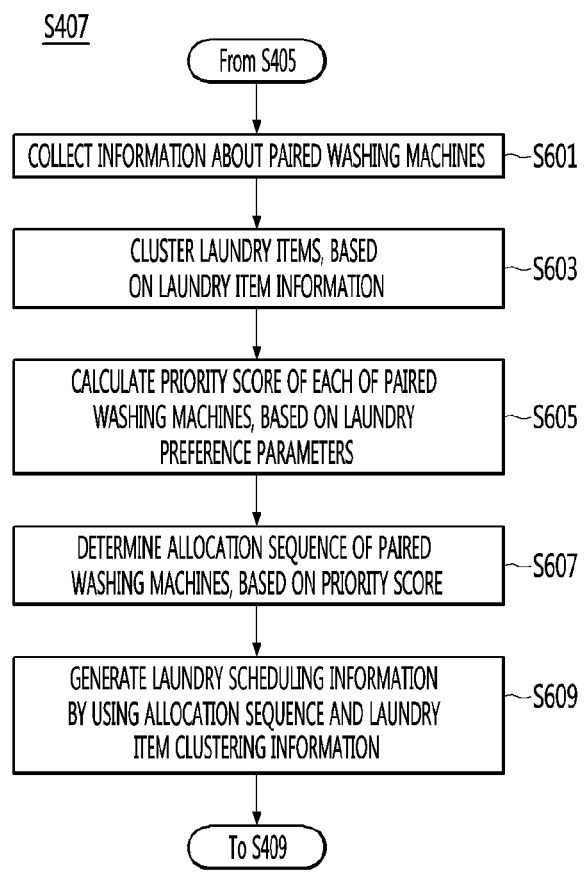
FIG. 6 is an operation flowchart illustrating an example of a step of generating laundry scheduling information illustrated in FIG. 4.

FIG. 6 is an operation flowchart illustrating an example of step S407 of generating the laundry scheduling information illustrated in FIG. 4.

Referring to FIG. 6, the processor 180 of the laundry scheduling apparatus 100 may collect washing machine information on paired washing machines (S601).

In this case, the washing machine information may be collected when the wireless communication unit 110 pairs with the washing machine 300 and may be stored in the memory 170, but may be previously stored washing machine information which corresponds to various washing machines in the memory 170.

In this case, the processor 180 may receive the washing machine information from the paired washing machine 300 or the scheduling support server 400 through the wireless communication unit 110 at a time when the washing machine information is needed.

The washing machine information may include a model name, a type, consumption power, an average laundry time, a supported laundry course, a laundry time of each laundry course, a level of cloth damage, a laundry capacity, and a feature (a supported function). Also, the supported function may include a dry-cleaning function, a clothes drying function, a dust removing function, a sterilization function, and an ironing function.

The processor 180 of the laundry scheduling apparatus 100 may cluster laundry items, based on the laundry item information (S603).

In this case, the processor 180 may cluster the laundry items through the learning processor 130 or the scheduling support server 400.

An operation of clustering laundry items may be performed by using the machine learning algorithm or the deep learning algorithm.

In this case, the operation of clustering laundry items may be an operation of differently classifying laundry items suitable for laundry separately. That is, laundry items may be clustered based on a material and a color of each of the laundry items.

In this case, when laundry priority information is obtained by a user input, laundry items may be clustered additionally based on the laundry priority information.

For example, knit cloth and cotton cloth may be distinguished from each other, based on materials of laundry items, and colored cloth and uncolored cloth capable of color bleeding may be distinguished from each other. Also, clothes which are to be preferentially washed by the user may be clustered.

The processor 180 of the laundry scheduling apparatus 100 may calculate a priority score of each of paired washing machines by using laundry preference parameters (S605).

The laundry preference parameters may include parameters respectively corresponding to the operating cost (consumption power), an operating time (a laundry time), a capacity, and a level of damage, and thus, a priority score of each of paired washing machines can be calculated.

In this case, the processor 180 may digitize each item of washing machine information corresponding to each of the paired washing machines and may calculate a priority score through an arithmetic operation based on a laundry preference parameter.

The priority score may be calculated by calculating a weighted sum of items of the washing machine information by using the laundry preference parameter as a weight.

For example, when it is assumed that a parameter corresponding to the operating cost is 20, a parameter corresponding to an operating time is 40, a parameter corresponding to a capacity is 20, and a parameter corresponding to a level of damage is 20, a specific user may assign a highest priority to the operating time.

Therefore, when two washing machines have only different operating times (laundry times) and have the same operating cost (consumption power), capacity, and level of damage, a washing machine where the operating time is short may have a priority score which is higher than that of a washing machine where the operating time is not short.

In this case, the processor 180 may normalize the items of the washing machine information.

On the other hand, the processor 180 may learn washing machine preference parameters so as to be suitable for each item of the washing machine information, and in this case, may not normalize the items of the washing machine information.

In the washing machine information, the operating cost, an operating time, and a level of damage may be preferred as a numerical value thereof is reduced, and a capacity may be preferred as a numerical value thereof increases. Therefore, the processor 180 may calculate an inverse number (or a numerical value corresponding thereto) of each of the operating cost, an operating time, and a level of damage and may use a corresponding value.

On the other hand, the processor 180 may learn (train) the washing machine preference parameters so as to be suitable for each item of the washing machine information, and in this case, a parameter corresponding to the operating cost, a parameter corresponding to an operating time, and a parameter corresponding to a level of damage may each denote that a preference of a user increases as a numerical value thereof is reduced.

The processor 180 may determine an allocation sequence of each of paired washing machines, based on the calculated priority score (S607).

In this case, the processor 180 may determine an allocation sequence of washing machines in ascending order or descending order of priority score.

The priority score may denote that a preference of a user is high as the preference score is low, or a preference of a user is high as the priority score is high. Therefore, the processor 180 may determine a washing machine allocation sequence by using a manner suitable for an implementation manner of the priority score.

For example, it may be assumed that paired washing machines include a drum washing machine and a mini washing machine and a preference of a user is high as a priority score is high.

When a priority score corresponding to a drum washing machine is 100 and a priority score corresponding to a mini washing machine is 80, the processor 180 may first allocate the drum washing machine to a laundry schedule and may second allocate the mini washing machine to the laundry schedule.

The processor 180 may generate laundry scheduling information by using the washing machine allocation sequence and laundry item clustering information (S609).

The processor 180 may cluster laundry items suitable for performing laundry together, based on information about materials or colors of laundry items, and thus, may distribute the clustered laundry items to each washing machine according to the washing machine allocation sequence.

For example, it may be assumed that laundry items are classified into a first cluster where the amount of laundry items is large and a second cluster where the amount of laundry items is small, and all of the first and second clusters do not need laundry by a special washing machine. The processor 180 may generate laundry scheduling information for allocating the first cluster, where the amount of laundry items is large, to a drum washing machine and allocating the second cluster, where the amount of laundry items is small, to a mini washing machine.

In this case, in distributing laundry items to washing machines, the processor 180 may consider the amount (volume or weight) of laundry items, a laundry item processing method, and a laundry preference of a user corresponding to each washing item cluster.

For example, it may be assumed that the second cluster where the amount of laundry items is small is higher in laundry preference of a user than the first cluster where the amount of laundry items is large, and the drum washing machine is higher than in allocation sequence than the mini washing machine. If the amount of laundry items of the first cluster is too large and thus cannot be all washed by the mini washing machine at a time, the processor 180 may distribute the laundry items of the first cluster to the drum washing machine despite a laundry preference of the first cluster is low.

Moreover, when a specific cluster of laundry items needs special processing of laundry and thus is suitable for a specific washing machine, the processor 180 may distribute a corresponding cluster to a washing machine suitable for laundry.

The processor 180 may perform learning by using the machine learning algorithm or the deep learning algorithm through the learning processor 130 or the scheduling support server 400 and may generate laundry scheduling information.

In an optional embodiment, steps S605 and S607 of calculating a priority score of each washing machine and determining an allocation sequence of each washing machine may be performed prior to steps S601 and S603 of collecting paired washing machine information and clustering laundry items.

In an optional embodiment, steps S605 and S607 of calculating a priority score of each washing machine and determining an allocation sequence of each washing machine may be performed in parallel with steps S601 and S603 of collecting paired washing machine information and clustering laundry items.

Figure 7:
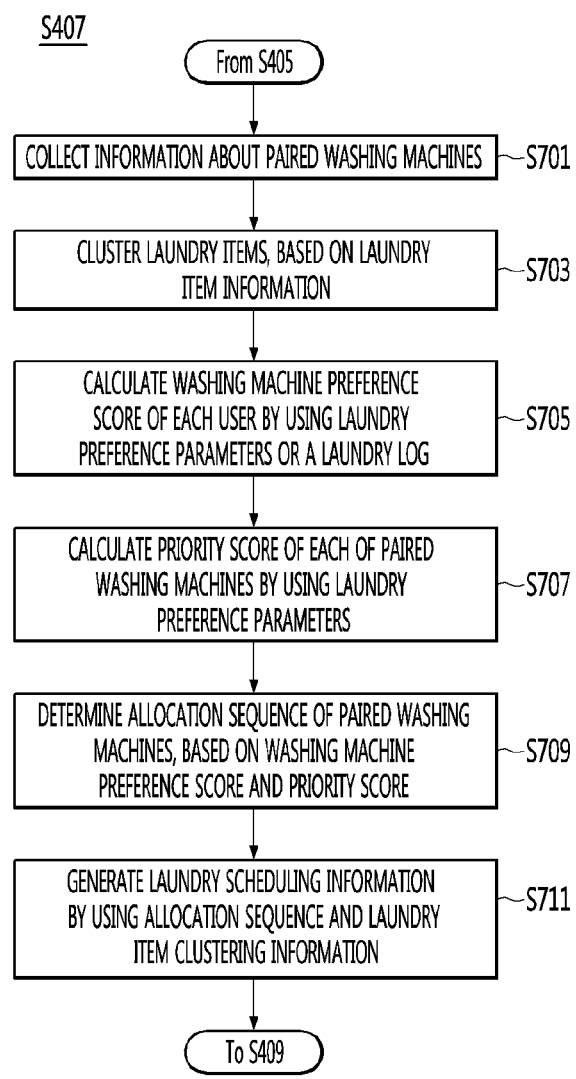
FIG. 7 is an operation flowchart illustrating an example of a step of generating the laundry scheduling information illustrated in FIG. 4.

FIG. 7 is an operation flowchart illustrating an example of step S407 of generating the laundry scheduling information illustrated in FIG. 4.

Referring to FIG. 7, the processor 180 of the laundry scheduling apparatus 100 may collect washing machine information on paired washing machines (S701).

The processor 180 of the laundry scheduling apparatus 100 may cluster laundry items, based on laundry item information (S703).

The processor 180 of the laundry scheduling apparatus 100 may calculate a washing machine preference score of each user by using laundry preference parameters or a laundry log of each user (S705).

The processor 180 may learn (train) a washing machine preference score of each user from laundry preference parameters or laundry log of each user through the learning processor 130 or the scheduling support server 400.

For example, when a usage rate of a washing machine a is higher than a usage rate of a washing machine b in a laundry log of a user A, the processor 180 may calculate a washing machine preference score of the washing machine a of the user A higher than a washing machine preference score of the washing machine b.

In calculating a washing machine preference score of each user, the processor 180 may additionally consider the laundry preference parameters.

The processor 180 of the laundry scheduling apparatus 100 may calculate a priority score of each of paired washing machines by using the laundry preference parameters (S707).

The processor 180 may determine an allocation sequence of each of the paired washing machines, based on the calculated washing machine preference score and priority score (S709).

The processor 180 may generate laundry scheduling information by using a washing machine allocation sequence and laundry item clustering information (S711).

Moreover, the laundry scheduling apparatus 100 may determine who a current user (a husband or a wife) is by analyzing a voice of a user or an interaction and may generate laundry scheduling information which mainly uses a washing machine having a high preference, based on a preference of the determined current user.

For example, it may be assumed that a wife mainly uses a general washing machine and a husband mainly uses a clothing care machine at home.

In the above case, when the wife performs laundry, the laundry scheduling apparatus 100 may generate laundry scheduling information representing that a general washing machine is mainly used, and when the husband performs laundry, the laundry scheduling apparatus 100 may generate laundry scheduling information representing that a clothing care machine is mainly used.

In an optional embodiment, step S705 of calculating the washing machine preference score of each user and step S707 of calculating the priority score of each washing machine may be performed in parallel.

In an optional embodiment, steps S705 to S709 of calculating the washing machine preference score of each user, calculating the priority score of each washing machine, and determining the allocation sequence may be performed prior to steps S701 and S703 of collecting paired washing machine information and clustering the laundry items.

In an optional embodiment, steps S705 to S709 of calculating the washing machine preference score of each user, calculating the priority score of each washing machine, and determining the allocation sequence may be performed in parallel with steps S701 and S703 of collecting paired washing machine information and clustering the laundry items.

Figure 8:
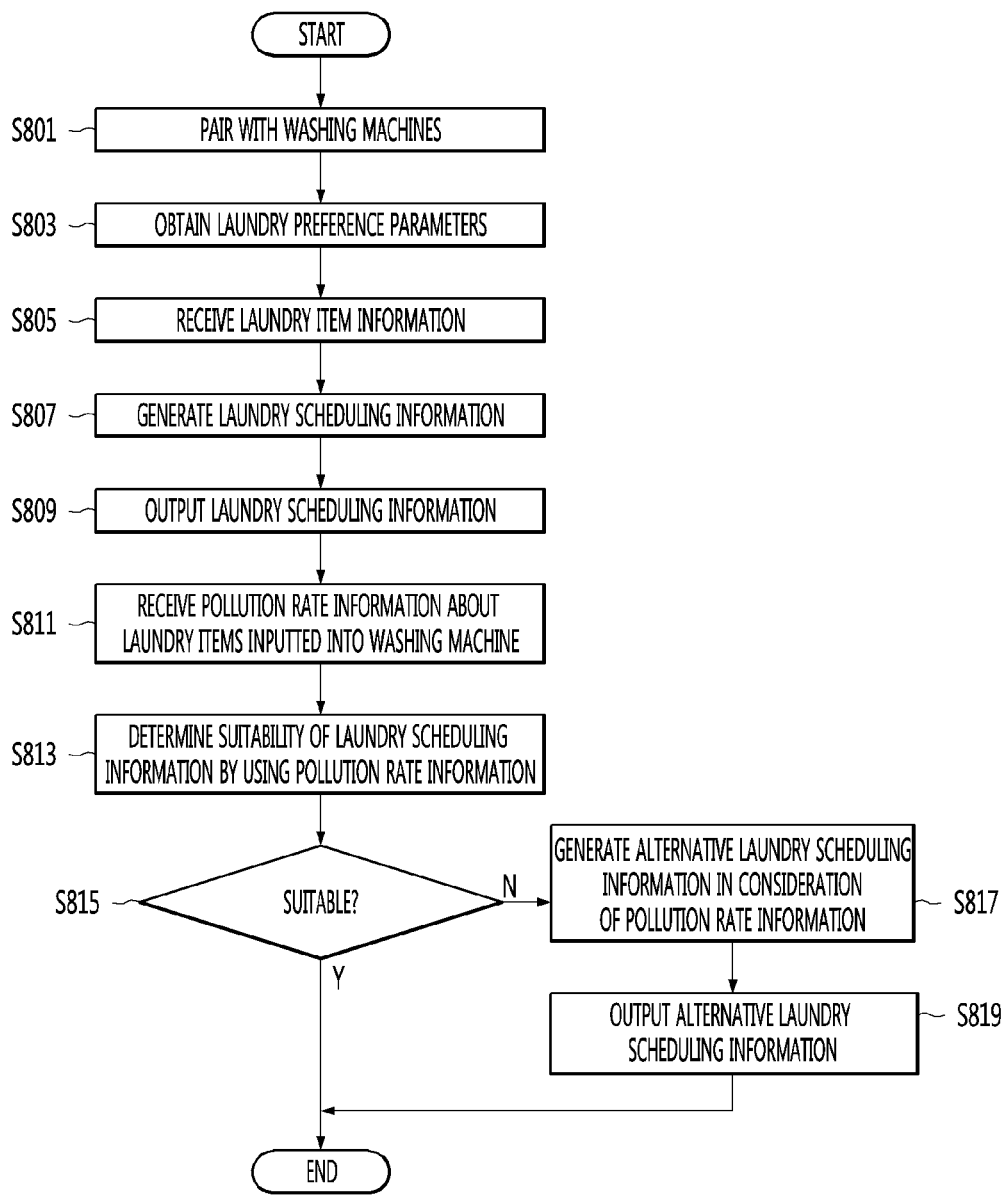
FIG. 8 is an operation flowchart illustrating a laundry scheduling method according to an embodiment of the present invention.

FIG. 8 is an operation flowchart illustrating a laundry scheduling method according to an embodiment of the present invention.

Referring to FIG. 8, in the laundry scheduling method according to an embodiment of the present invention, the wireless communication unit 110 of the laundry scheduling apparatus 100 may transmit or receive a pairing signal to or from the one or more washing machines 300 to pair with the one or more washing machines 300 (S801).

The processor 180 of the laundry scheduling apparatus 100 may obtain user-based laundry preference parameters generated by learning, as input data, one or more of a laundry log of a user and laundry satisfaction information of the user (S803).

The processor 180 of the laundry scheduling apparatus 100 may receive laundry item information about laundry items which are to be washed (S805).

The processor 180 of the laundry scheduling apparatus 100 may generate laundry scheduling information by using washing machine information, laundry item information, and the laundry preference parameters (S807).

The processor 180 of the laundry scheduling apparatus 100 may output the generated laundry scheduling information to provide the generated laundry scheduling information to the user (S809).

The processor 180 of the laundry scheduling apparatus 100 may receive soil level information on laundry items inputted into a washing machine from the paired washing machines (S811).

The washing machine 300 may measure a soil level of the inputted laundry items through the sensing unit and may transmit the measured soil level information to the laundry scheduling apparatus 100.

The processor 180 of the laundry scheduling apparatus 100 may determine suitability of the laundry scheduling information by using the soil level information (S813 and S815).

When it is determined that the soil level of the inputted laundry items is very high and thus soil cannot be completely removed by the laundry is performed based on currently generated laundry scheduling information, the processor 180 may determine that the laundry scheduling information is unsuitable.

Suitability of the laundry scheduling information may be determined as whether a predicted soil level after the laundry is equal to or greater than a reference value by considering the soil level of the inputted laundry items and an expected cleaning force from the corresponding laundry scheduling information.

When it is determined in step S815 that the laundry scheduling information is suitable, a procedure may end without performing a separate procedure.

When it is determined in step S815 that the laundry scheduling information is unsuitable, the processor 180 of the laundry scheduling apparatus 100 may generate alternative laundry scheduling information in consideration of the soil level information (S817).

The alternative laundry scheduling information may denote laundry scheduling information including a laundry schedule sufficient to remove soil.

For example, the previous laundry scheduling information may be set that a washing machine a washes a laundry item A in a fast laundry mode, but the alternative laundry scheduling information may be set that a washing machine b performs laundry in a high cleaning laundry mode because a soil level of the laundry item A is high.

Moreover, the processor 180 may output a message "a high cleaning laundry mode is more suitable than a fast laundry mode because a soil level of a laundry item is very high. Will you proceed laundry in the high cleaning laundry mode?" to the user.

The processor 180 of the laundry scheduling apparatus 100 may output the generated alternative laundry scheduling information to provide the alternative laundry scheduling information to the user (S819).

In an embodiment, step S805 of receiving the laundry item information and step S803 of obtaining the laundry preference parameters may be performed in parallel.

In an embodiment, step S805 of receiving the laundry item information may be first performed, and then, step S803 of obtaining the laundry preference parameters may be performed.

Figure 9:
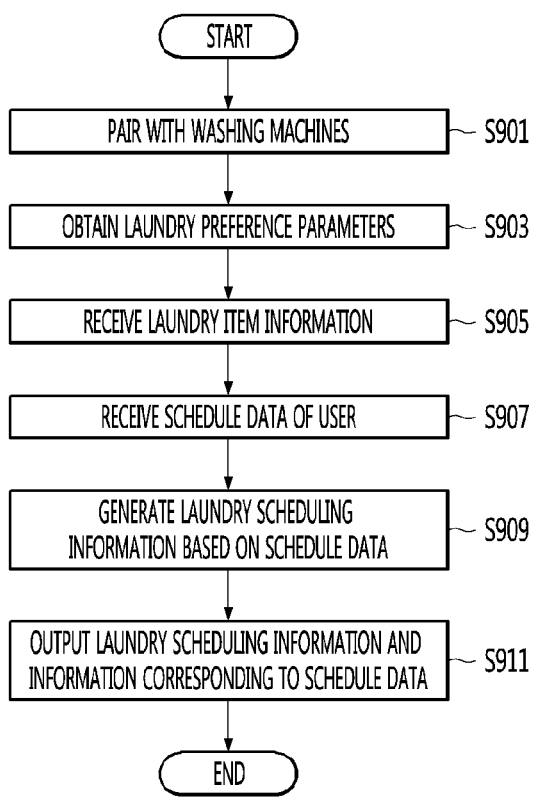
FIG. 9 is an operation flowchart illustrating a laundry scheduling method according to an embodiment of the present invention.

FIG. 9 is an operation flowchart illustrating a laundry scheduling method according to an embodiment of the present invention.

Referring to FIG. 9, in the laundry scheduling method according to an embodiment of the present invention, the wireless communication unit 110 of the laundry scheduling apparatus 100 may transmit or receive a pairing signal to or from the one or more washing machines 300 to pair with the one or more washing machines 300 (S901).

The processor 180 of the laundry scheduling apparatus 100 may obtain user-based laundry preference parameters generated by learning, as input data, one or more of a laundry log of a user and laundry satisfaction information of the user (S903).

The processor 180 of the laundry scheduling apparatus 100 may receive laundry item information about laundry items which are to be washed (S905).

The processor 180 of the laundry scheduling apparatus 100 may receive schedule data of the user (S907).

The processor 180 may receive the schedule data of the user stored in the memory 170 and may receive, through the wireless communication unit 110, the schedule data of the user stored in the remote control apparatus 200 or the laundry scheduling server 400.

In the schedule data of the user, a schedule of the user may be expressed as date information and time information.

Furthermore, the schedule data of the user may include information representing the type of the schedule of the user.

For example, the schedule data of the user may include information representing the type of a schedule and information representing time like "job interview at 2:00 p.m. tomorrow", "dinner at 7:00 p.m. today", and "go a walk at 6:00 p.m. today, and return home at 8:00 p.m.".

The processor 180 of the laundry scheduling apparatus 100 may generate laundry scheduling information based on the schedule data of the user (S909).

For example, when the user has a schedule after two hours, the processor 180 may generate laundry scheduling information for performing fast laundry so that laundry is completed within two hours.

Alternatively, when the user has a schedule where the user goes out after one hour and returns after three hours, the processor 180 may generate laundry scheduling information including a laundry reservation function so that laundry ends on a time when the user returns home.

That is, even when the user desires clear laundry currently, the processor 180 may provide laundry scheduling information for recommending fast laundry or a laundry reservation mode in consideration of a schedule.

The processor 180 of the laundry scheduling apparatus 100 may output the generated laundry scheduling information and information corresponding to the schedule data to provide the laundry scheduling information and the information to the user (S909).

For example, the processor 180 may output a message "You have a dinner schedule after two hours. If fast laundry is performed, laundry can end before the schedule" or "You have a Two-hour schedule after one hour. A reservation function will be used so that laundry ends on a return time".

In an embodiment, step S905 of receiving the laundry item information and step S903 of obtaining the laundry preference parameters may be performed in parallel.

In an embodiment, step S905 of receiving the laundry item information may be first performed, and then, step S903 of obtaining the laundry preference parameters may be performed.

Figure 10:
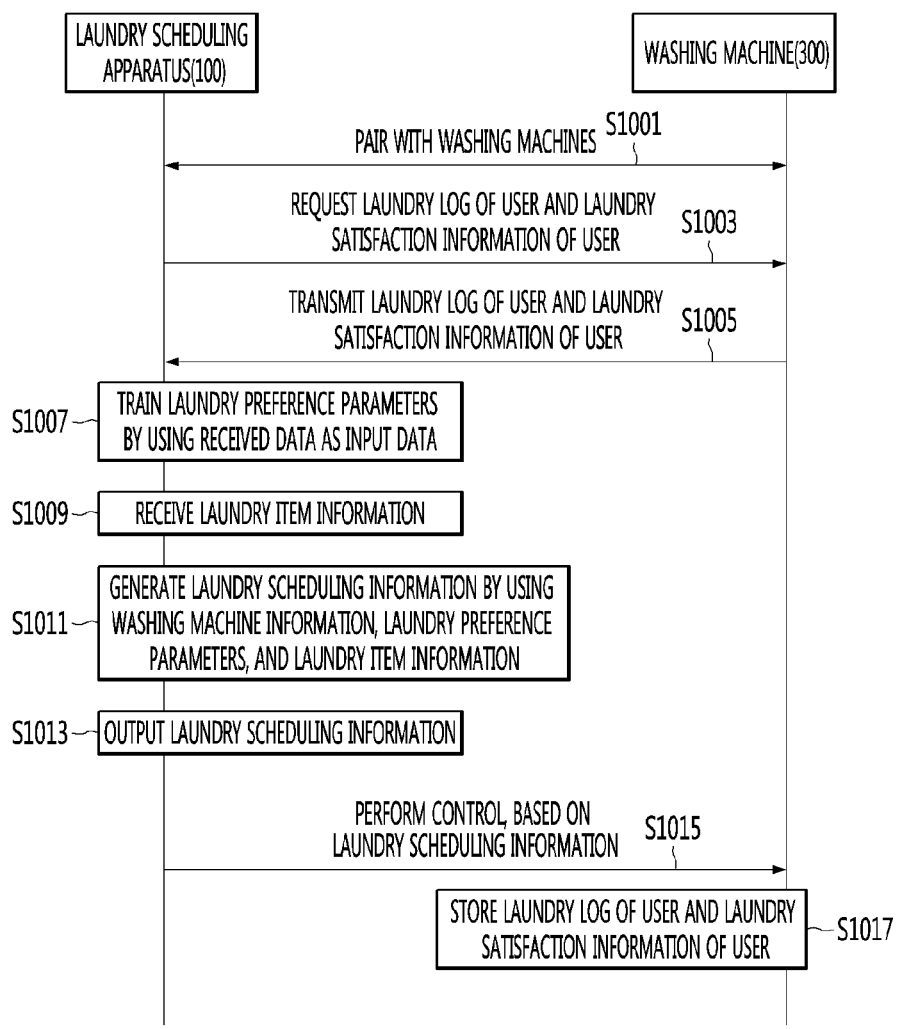
FIG. 10 is a ladder diagram illustrating a laundry scheduling method according to an embodiment of the present invention.

FIG. 10 is a ladder diagram illustrating a laundry scheduling method according to an embodiment of the present invention.

Referring to FIG. 10, the laundry scheduling apparatus 100 may perform a washing machine pairing operation with the washing machine 300 (S1001).

The laundry scheduling apparatus 100 may request a laundry log of a user and laundry satisfaction information of the user from the washing machine 300 (S1003).

Yet, FIG. 10 illustrates the washing machine 300 which stores the laundry log of the user and the laundry satisfaction information of the user, but the laundry scheduling apparatus 100 also may store the laundry log of the user and the laundry satisfaction information of the user.

The washing machine 300 may transmit the laundry log of the user and the laundry satisfaction information of the user to the laundry scheduling apparatus 100 (S1005).

The laundry scheduling apparatus 100 may learn (train) laundry preference parameters by using received data as input data (S1007).

As described above, the processor 180 of the laundry scheduling apparatus 100 may learn (train) the laundry preference parameters by using the machine learning algorithm or the deep learning algorithm through the learning processor 130 or the scheduling support server 400.

The laundry scheduling apparatus 100 may receive laundry item information (S1009).

In this case, the laundry scheduling apparatus 100 may receive voice data based on utterance of the user, or may recognize a barcode, a clothing tag, and a chip included in laundry items to obtain laundry item information.

The laundry scheduling apparatus 100 may generate laundry scheduling information by using washing machine information, the laundry preference parameters, and the laundry item information (S1011).

The laundry scheduling apparatus 100 may output the laundry scheduling information (S1013).

In this case, the laundry scheduling information may be output from one or more of the output unit 150 of the laundry scheduling apparatus 100, an output unit of the remote control apparatus 200, and an output unit of the washing machine 300.

The laundry scheduling apparatus 100 may control the washing machine 300, based on the laundry scheduling information (S1015).

For example, the laundry scheduling apparatus 100 may perform control to output a message "input a laundry item a into a washing machine A", based on laundry scheduling information representing that the washing machine A washes the laundry item a according to a fast laundry course. Also, the laundry scheduling apparatus 100 may perform control to output a message which proposes the fast laundry course if the laundry item a is inputted into the washing machine A and to set a laundry course to the fast laundry course.

Here, an output of a message may be performed various forms such as a voice, an image, a vibration, light emission, and flickering.

The washing machine 300 may store the laundry log of the user and the laundry satisfaction information of the user (S1017).

As laundry is performed, the laundry log of the user may be generated and may be stored in a memory of the washing machine 300.

Moreover, the washing machine 300 may store the laundry satisfaction information of the user in the memory.

Here, the laundry satisfaction information may be obtained through the input unit 120 of the laundry scheduling apparatus 100, a user input unit or a sound input unit of the remote control apparatus 200, or an input unit of the washing machine 300.

Moreover, when there is no separate input corresponding to the laundry satisfaction information, a level of laundry satisfaction may be calculated from the laundry log.

For example, a level of laundry satisfaction corresponding to the laundry log may be calculated by using the laundry preference parameters as weights.

Figure 11:
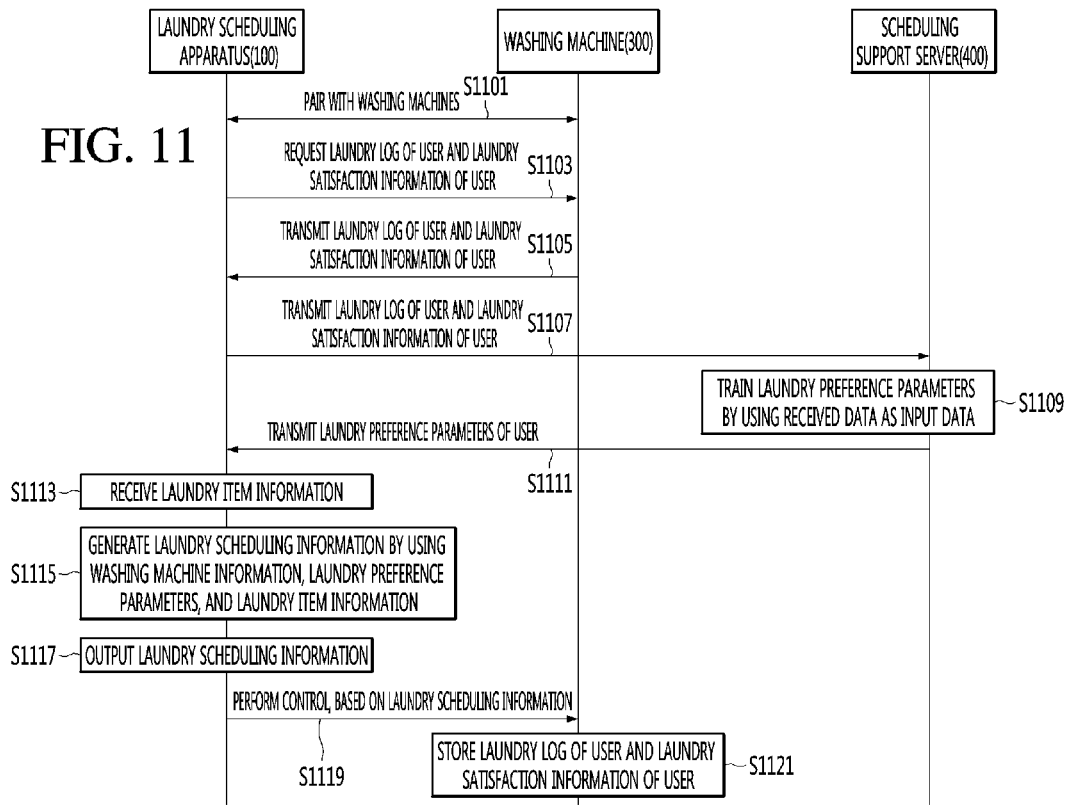
FIG. 11 is a ladder diagram illustrating a laundry scheduling method according to an embodiment of the present invention.
Figure 12:
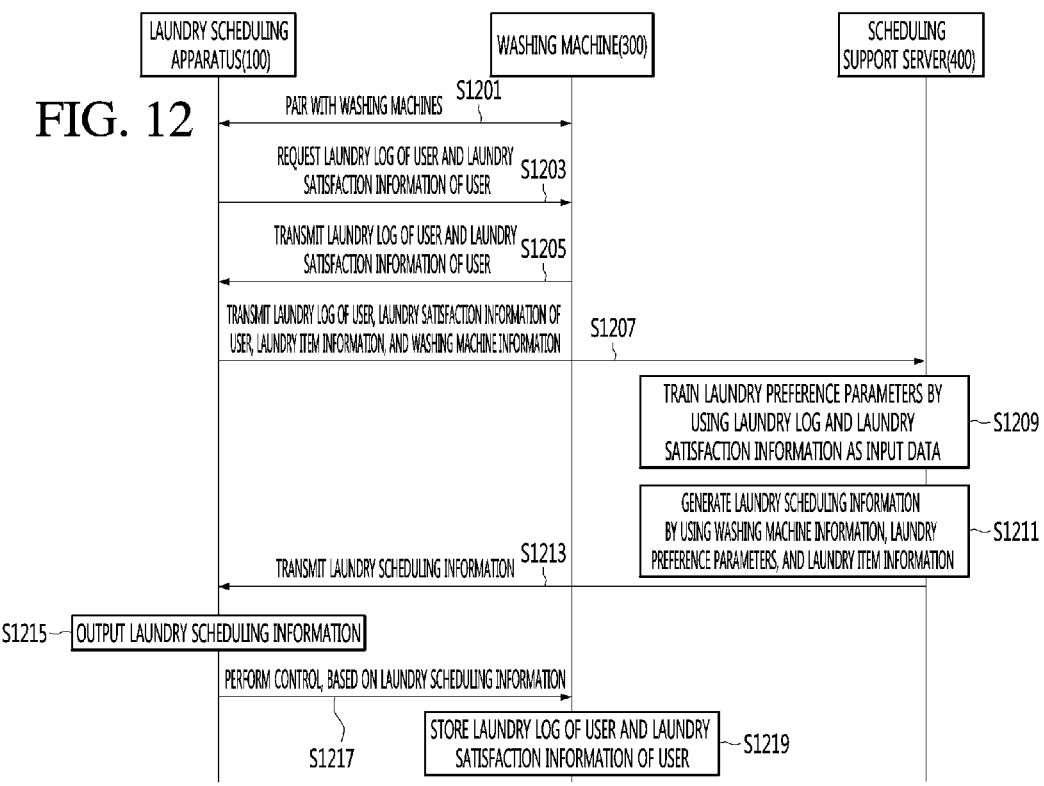
FIG. 12 is a ladder diagram illustrating a laundry scheduling method according to an embodiment of the present invention.

Yet, FIGS. 10 to 12 only discloses a configuration of the washing machine 300 which stores the laundry log of the user and the laundry satisfaction information of the user, but the laundry log of the user and the laundry satisfaction information of the user also may be stored in the memory 170 of the laundry scheduling apparatus 100 or the scheduling support server 400.

FIG. 11 is a ladder diagram illustrating a laundry scheduling method according to an embodiment of the present invention.

Referring to FIG. 11, the laundry scheduling apparatus 100 may perform a washing machine pairing operation with the washing machine 300 (S1101).

The laundry scheduling apparatus 100 may request a laundry log of a user and laundry satisfaction information of the user from the washing machine 300 (S1103).

The washing machine 300 may transmit the laundry log of the user and the laundry satisfaction information of the user to the laundry scheduling apparatus 100 (S1105).

The laundry scheduling apparatus 100 may transmit the laundry log of the user and the laundry satisfaction information of the user to the scheduling support server 400 (S1107).

The scheduling support server 400 may learn (train) laundry preference parameters by using received data as input data (S1109).

The scheduling support server 400 may transmit the laundry preference parameters to the laundry scheduling apparatus 100 (S1111).

The laundry scheduling apparatus 100 may receive laundry item information (S1113).

The laundry scheduling apparatus 100 may generate laundry scheduling information by using washing machine information, the laundry preference parameters, and the laundry item information (S1115).

The laundry scheduling apparatus 100 may output the laundry scheduling information (S1117).

The laundry scheduling apparatus 100 may control the washing machine 300, based on the laundry scheduling information (S1119).

The washing machine 300 may store the laundry log of the user and the laundry satisfaction information of the user (S1121).

FIG. 12 is a ladder diagram illustrating a laundry scheduling method according to an embodiment of the present invention.

Referring to FIG. 12, the laundry scheduling apparatus 100 may perform a washing machine pairing operation with the washing machine 300 (S1201).

The laundry scheduling apparatus 100 may request a laundry log of a user and laundry satisfaction information of the user from the washing machine 300 (S1203).

The washing machine 300 may transmit the laundry log of the user and the laundry satisfaction information of the user to the laundry scheduling apparatus 100 (S1205).

The laundry scheduling apparatus 100 may transmit the laundry log of the user, the laundry satisfaction information of the user, laundry item information, and washing machine information to the scheduling support server 400 (S1207).

Although not shown in FIG. 12, the laundry scheduling apparatus 100 may obtain the washing machine information in step S1201 of pairing with the washing machine 300.

Moreover, the laundry scheduling apparatus 100 may obtain the laundry item information through an interaction of the user before step S1207 of transmitting data to the scheduling support server 400.

The scheduling support server 400 may learn (train) laundry preference parameters by using the laundry log and the laundry satisfaction information as input data (S1209).

The scheduling support server 400 may generate laundry scheduling information by using the washing machine information, the laundry preference parameters, and the laundry item information (S1211).

The scheduling support server 400 may transmit the laundry scheduling information to the laundry scheduling apparatus 100 (S1213).

The laundry scheduling apparatus 100 may output the laundry scheduling information (S1215).

The laundry scheduling apparatus 100 may control the washing machine 300, based on the laundry scheduling information (S1217).

The washing machine 300 may store the laundry log of the user and the laundry satisfaction information of the user (S1219).

Figure 13:
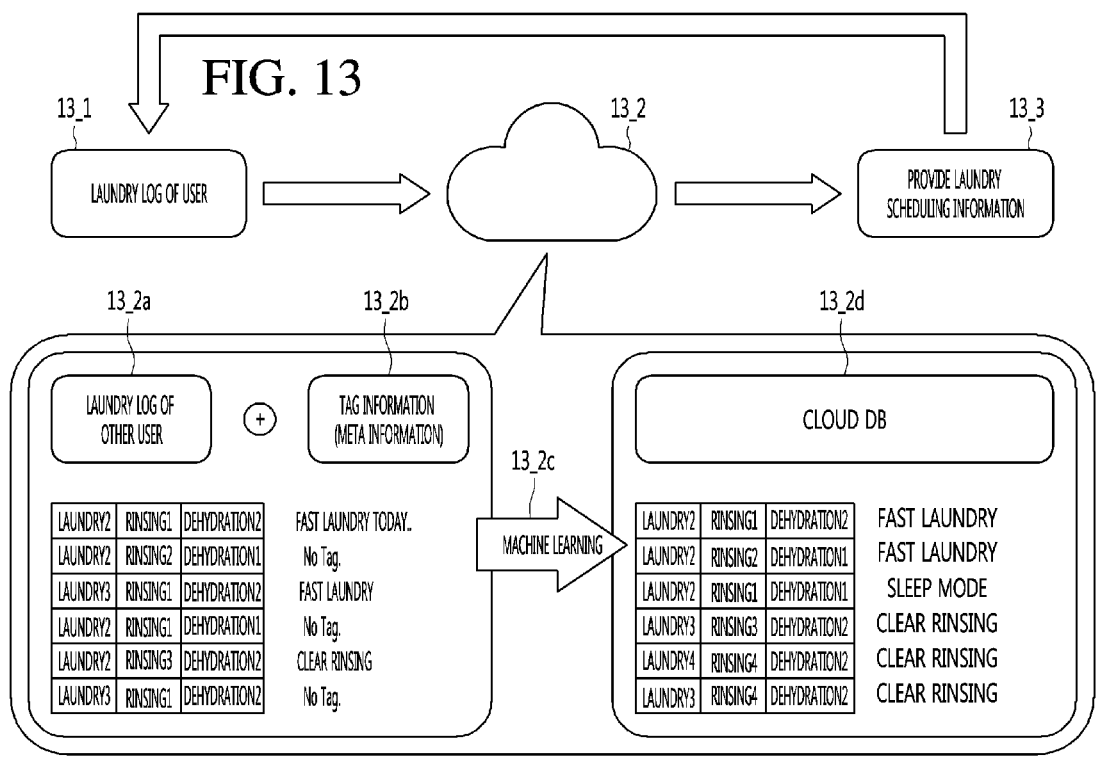
FIG. 13 is a diagram illustrating a process of providing laundry scheduling information according to an embodiment of the present invention.

FIG. 13 is a diagram illustrating a process of providing laundry scheduling information according to an embodiment of the present invention.

Referring to FIG. 13, the laundry scheduling apparatus 100 may generate and provide laundry scheduling information 13_3 by using a laundry log 13_1 of a user and database information stored in a scheduling support server 13_2.

The user may perform laundry on the basis of the generated laundry scheduling information 13_3, and the laundry may be recorded in the laundry log 13_1 of the user and may become a base of generating the laundry scheduling information 13_3.

The scheduling support server 13_2 may store a laundry log 13_2a of another user and tag information 13_2b corresponding to each laundry log. Also, a cloud database 13_2d may be configured from the stored tag information 13_2b and laundry log 13_2a of the other user, based on machine learning 13_2c.

Moreover, the laundry log 13_1 of the user may be transmitted to the scheduling support server 13_2, and the cloud database 13_2d may be configured based on the machine learning 13_2c.

Here, the machine learning 13_2c may denote a bigdata analysis technique.

For example, the scheduling support server 13_2 may perform clustering on the laundry log 13_2a to cluster laundry logs and may perform semi-supervised learning on the laundry log 13_2a by using the tag information 13_2b as a label to label the laundry logs, thereby configuring the cloud database 13_2d.

Moreover, in a case of obtaining laundry satisfaction information of a user, the scheduling support server 13_2 may reflect the laundry satisfaction information as a feedback to reflect the laundry satisfaction information in clustering or semi-supervised learning, thereby correcting classification of the laundry logs.

The laundry log 13_2a may include detailed information about a laundry course corresponding to each of the laundry logs.

For example, a laundry log 1 may consist of two-time laundry, one-time rinsing, and two-time dehydration.

The tag information 13_2b may denote meta information representing a request or a situation corresponding to each laundry log.

For example, the tag information 13_2b may include "fast laundry", "clear rinsing", and "power saving mode".

In this case, the tag information 13_2b may not be included in all laundry logs 13_2a.

Tag information for distinguishing course-based feature may be stored in the cloud database 13_2d.

That is, the cloud database 13_2d may cluster the laundry log 13_2a and the tag information 13_2b to distinguish a feature of each item.

For example, items stored in the cloud database 13_2d may be classified into "fast laundry", "clear rinsing", and "power saving mode".

As described above, the scheduling support server 13_2 may learn laundry logs of several users, and thus, a large amount of input data may be secured, thereby increasing an accuracy of learning.

FIG. 14 is a diagram illustrating a laundry scheduling method according to an embodiment of the present invention.

Referring to FIG. 14, the laundry scheduling apparatus 100 may be used by one or more users 14_1a to 14_1c.

When laundry item information 14_2 is input, the laundry scheduling apparatus 100 may generate laundry scheduling information 14_4 based on a washing machine set 14_3 including one or more washing machines 14_3a to 14_3d.

The washing machine set 14_3 may include washing machines such as a general washing machine (a top loading washing machine), a drum washing machine, a mini washing machine, a laundry drying machine, and a clothing care machine.

As illustrated in FIG. 14, the laundry scheduling apparatus 100 may generate the laundry scheduling information 14_4 suitable for the laundry item information 14_2 and the washing machine set 14_3 and may identically provide the laundry scheduling information 14_4 to the users 14_1a to 14_1c.

Figure 15:
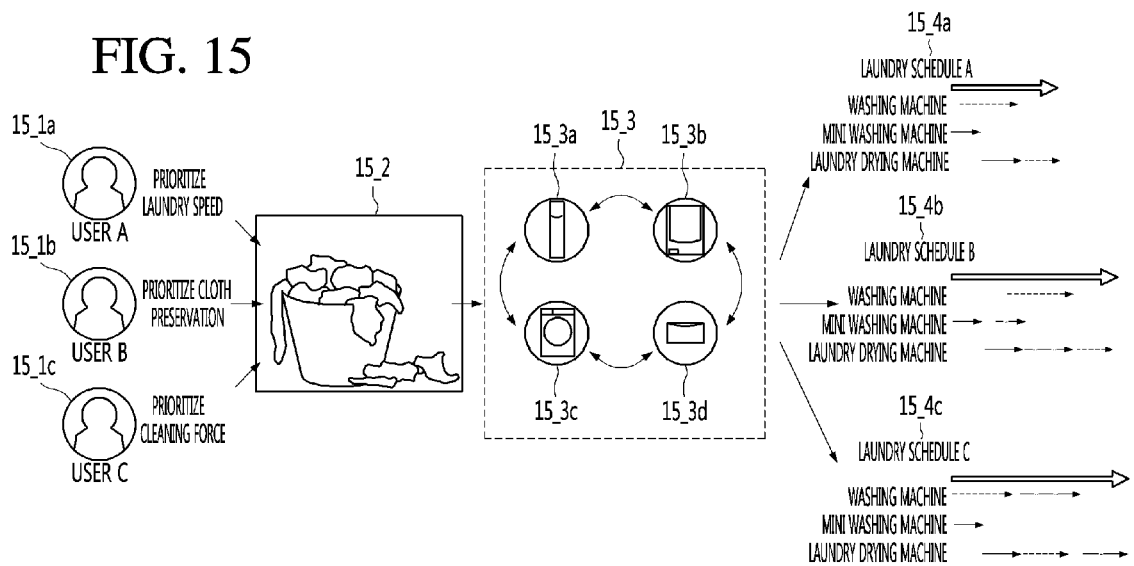
FIG. 15 is a diagram illustrating a laundry scheduling method according to an embodiment of the present invention.

FIG. 15 is a diagram illustrating a laundry scheduling method according to an embodiment of the present invention.

Referring to FIG. 15, the laundry scheduling apparatus 100 may be used by one or more users 15_1a to 15_1c.

Each of the users 15_1a to 15_1c may include a laundry preference, and relevant information may be represented by laundry preference parameters.

For example, a user A 15_1a may prioritize a laundry speed, a user B 15_1b may prioritize cloth preservation, and a user C 15_1c may prioritize a cleaning force.

When laundry item information 15_2 is input, the laundry scheduling apparatus 100 may generate laundry scheduling information 15_4 based on preferences of the users 15_1a to 15_1c and a washing machine set 15_3 including one or more washing machines 15_3a to 15_3d.

For example, the laundry item information 15_2 may include information for classifying features of laundry items which are to be washed, like "materials easy to spoil cloth are 20%, duvets are 50%, and general dresses are 30%".

As illustrated in FIG. 15, the laundry scheduling apparatus 100 may generate laundry scheduling information suitable for a user preference, the laundry item information 15_2, and the washing machine set 15_3 for each of the users 15_1a to 15_1c and may provide the laundry scheduling information to the users 15_1a to 15_1c.

Laundry scheduling information 15_4a generated based on a preference of the user A 15_1a may be provided to the user A 15_1a. Laundry scheduling information 15_4b generated based on a preference of the user B 15_1b may be provided to the user B 15_1b. Laundry scheduling information 15_4c generated based on a preference of the user C 15_1c may be provided to the user C 15_1c.

In a case of preferring a high cleaning laundry, the reliability of a general washing machine may be high, and thus, a laundry time may be shortened by generating laundry scheduling information about the general washing machine.

In a case of preferring cloth preservation, the reliability of a clothing care machine may be higher than that of a laundry drying machine, and thus, laundry scheduling information using the clothing care machine instead of the laundry drying machine may be generated, thereby reducing damage of cloth.

In a case of preferring a short laundry time, a washing machine having a large capacity may be preferred, and thus, laundry scheduling information for increasing priority in an allocation sequence of the washing machine having a large capacity may be generated, thereby increasing a laundry speed.

For example, since the user A 15_1a prioritizes a laundry speed, a mini washing machine may first start to wash 20% (a laundry item cluster a-1) of laundry items, and a general washing machine may wash the other laundry items (a laundry item cluster a-2).

A laundry time of the general washing machine may be a time when a drying end time of a laundry drying machine of the laundry item cluster a-1 matches a laundry end time of the general washing machine.

Therefore, the laundry drying machine may start to dry laundry items washed by the general washing machine immediately after laundry ends. Accordingly, a laundry time may be shortened by 30 minutes.

Moreover, since the user B 15_1*b* prioritizes cloth preservation, the mini washing machine may first start to wash half (a laundry item cluster b-1) of clothes where their materials are easy to spoil, and then the mini washing machine may wash the other half (a laundry item cluster b-2) of the clothes where their materials are easy to spoil.

A laundry time of the laundry item cluster b-2 may be a time when a laundry end time of the laundry item cluster b-2 matches a drying end time of the laundry item cluster b-1.

The general washing machine may wash the other laundry items (a laundry item cluster b-3) at a certain time interval (for example, 20 minutes) after the washing of the laundry item cluster b-2 starts.

A laundry time of the laundry item cluster b-3 may be a time when a laundry end time of the laundry item cluster b-3 matches a drying end time of the laundry item cluster b-2.

Therefore, laundry may be performed without damage of cloth.

Moreover, since the user C15_1*c* prioritizes a cleaning force, the mini washing machine may first start to wash 20% (a laundry item cluster c-1) of laundry items, and the general washing machine may wash the other half (a laundry item cluster c-2) of the laundry items.

The general washing machine may wash remaining laundry items (a laundry item cluster c-3) around a time when washing and drying of the laundry item cluster c-1 end.

Therefore, laundry items may be clearly washed with a high cleaning force.

According to an embodiment of the present invention, the above-described method may be implemented as a processor-readable code in a medium where a program is recorded. Examples of a processor-readable medium may include read-only memory (ROM), random access memory (RAM), CD-ROM, a magnetic tape, a floppy disk, and an optical data storage device.

The above-described terminal is not applied to be limited to the configuration and method of the above-described embodiments and may be configured by selectively combining all or some of the embodiments so that the embodiments are variously modified.

According to various embodiments of the present invention, an integrated laundry schedule based on a laundry log of a user, a feature of a washing machine, and features of laundry items may be provided, and thus, a washing operation which meets a level of satisfaction of the user and is suitable for each laundry item may be performed, whereby the user may obtain a high level of satisfaction.

According to various embodiments of the present invention, information representing that a currently provided laundry schedule is insufficient to remove soil of inputted laundry items and an alternative laundry schedule suitable for current laundry items may be provided, thereby increasing the reliability of laundry.

According to various embodiments of the present invention, an alternative laundry schedule suitable for a schedule of a user may be provided, and thus, a washing operation may be performed despite the schedule of the user.

It will be apparent to those skilled in the art that various modifications and variations can be made in the present invention without departing from the spirit or scope of the disclosures. Thus, it is intended that the present invention covers the modifications and variations of this disclosure provided they come within the scope of the appended claims and their equivalents.

What is claimed is:

1. An apparatus comprising:
a communication unit;
an output unit; and
a processor configured to:
pair with at least one washing machine via the communication unit, wherein the at least one washing machines corresponds to a dryer;
obtain laundry preference parameters of a user generated through training based on at least one of a deep learning algorithm or a machine learning algorithm using at least one of a laundry log of the user or laundry satisfaction information of the user as input data;
generate laundry scheduling information including an operating time of the apparatus by using washing machine information about the paired at least one washing machine, the laundry preference parameters, and laundry item information obtained via at least one of a user input unit, an interface unit, or a sensor, wherein the operating time of the apparatus is determined based on an availability time of the paired at least one washing machine;
cause the output unit to output the laundry scheduling information; and
control the apparatus based on the laundry scheduling information.

2. The apparatus of claim 1, wherein the processor is further configured to:
determine a priority score of each of the paired at least one washing machine by using the laundry preference parameters and the washing machine information; and
determine an allocation sequence of the paired at least one washing machine based on the priority score, wherein the laundry scheduling information is generated by using the allocation sequence and the laundry item information.

3. The apparatus of claim 1, wherein:
the laundry log comprises at least one of a type of a washing machine used for laundry, a laundry course used for the laundry, or a target laundry item; and
the laundry scheduling information comprises at least one of laundry item distribution information, laundry course information, or laundry item input time information for each of the paired at least one washing machine.

4. The apparatus of claim 1, wherein:
the washing machine information comprises at least one of a model name, a machine type, consumption power, an average laundry time, a laundry time of each laundry course, a supported laundry course, a level of cloth damage, a laundry capacity, or a supported function of each of the paired at least one washing machine; and
the laundry item information comprises at least one of a color, a material, a type, a size, or a soil level of a laundry item to be washed.

5. The apparatus of claim 1, wherein:
based on tag information corresponding to a condition of each item of the laundry log, the processor is further configured to obtain the laundry preference parameters generated through training using the tag information as additional input data; and
the tag information comprises at least one of tag information corresponding to a laundry time, tag information corresponding to a cleaning force, or tag information corresponding to a laundry cost.

6. The apparatus of claim 1, wherein the laundry preference parameters comprise at least one of an operating cost parameter, a laundry time parameter, a capacity parameter, a damage level parameter, or a cleaning force parameter.

7. The apparatus of claim 1, wherein the processor is further configured to:
 determine a washing machine preference score of the user by using at least one of the laundry log or the laundry preference parameters, wherein the laundry scheduling information is generated using the washing machine preference score.

8. The apparatus of claim 1, wherein the processor is further configured to:
 cause the output unit to output information corresponding to the schedule data along with the laundry scheduling information, wherein the laundry scheduling information is generated using schedule data of the user.

9. The apparatus of claim 1, wherein the processor is further configured to:
 cause the communication unit to receive soil level information of at least one laundry item to be washed from each of the paired at least one washing machine obtained via the sensor in each of the paired at least one washing machine;
 generate alternative laundry scheduling information based on the laundry scheduling information in consideration of the soil level information; and
 cause the output unit to output the alternative laundry scheduling information.

10. The apparatus of claim 1, wherein the processor is further configured to:
 receive the laundry preference parameters generated from a learning processor performing the machine learning algorithm or the deep learning algorithm; or
 receive, via the communication unit, the laundry preference parameters generated from a scheduling support server performing the machine learning algorithm or the deep learning algorithm.

11. The apparatus of claim 10, wherein:
 the communication unit is configured to transmit at least one of the laundry log or the laundry satisfaction information to the scheduling support server; and
 the processor is further configured to obtain the laundry preference parameters, generated through training which uses, as additional input data, at least one of the laundry satisfaction information or the laundry log of each of a plurality of users, from the learning processor or the scheduling support server.

12. A laundry scheduling method comprising:
 pairing at least two washing machines via a communication unit, wherein the at least two washing machines correspond to at least a washer and a dryer;
 obtaining, by a processor, laundry preference parameters of a user generated through training based on at least one of a deep learning algorithm or a machine learning algorithm using at least one of a laundry log of the user or laundry satisfaction information of the user as input data;
 generating, by the processor, laundry scheduling information including an operating time of the washing machine by using washing machine information about the paired at least one washing machine, the laundry preference parameters, and laundry item information obtained via at least one of a user input unit, an interface unit, or a sensor, wherein the operating time of the washing machine is determined based on an availability time of the dryer;
 outputting, by an output unit, the laundry scheduling information; and
 control, by the processor, at least the washer or the dryer based on the laundry scheduling information.

13. A non-transitory machine-readable medium comprising instructions, when executed by a machine, causing the machine to perform operations comprising:
 obtaining laundry preference parameters of a user generated through training based on at least one of a deep learning algorithm or a machine learning algorithm using at least one of a laundry log of the user or laundry satisfaction information of the user as input data;
 generating laundry scheduling information including an operating time of a washer by using washing machine information about paired washing machines, the laundry preference parameters, and laundry item information obtained via at least one of a user input unit, an interface unit, or a sensor, wherein the operating time of the washing machine is determined based on an availability time of a dryer;
 outputting the laundry scheduling information; and
 controlling at the washer or the dryer based on the laundry scheduling information.

* * * * *